(12) United States Patent
Johnson et al.

(10) Patent No.: US 9,246,610 B2
(45) Date of Patent: Jan. 26, 2016

(54) MULTIMEDIA ALERTING

(71) Applicant: Weather Decision Technologies, Norman, OK (US)

(72) Inventors: James T. Johnson, Norman, OK (US); Lee M. Robb, Oklahoma City, OK (US); Clair L. Hehnly, Jr., Oklahoma City, OK (US); Xuechao Yu, Norman, OK (US); Caleb Creed, Norman, OK (US)

(73) Assignee: WEATHER DECISION TECHNOLOGIES, INC., Norman, OK (US)

( * ) Notice: Subject to any disclaimer, the term of this patent is extended or adjusted under 35 U.S.C. 154(b) by 0 days.

(21) Appl. No.: 14/663,643

(22) Filed: Mar. 20, 2015

(65) Prior Publication Data

US 2015/0256277 A1   Sep. 10, 2015

Related U.S. Application Data

(63) Continuation-in-part of application No. 14/335,213, filed on Jul. 18, 2014, now Pat. No. 8,990,333, which is a continuation-in-part of application No. 13/082,236, filed on Apr. 7, 2011, now Pat. No. 8,788,606.

(60) Provisional application No. 61/322,640, filed on Apr. 9, 2010.

(51) Int. Cl.
| | |
|---|---|
| *G06F 15/16* | (2006.01) |
| *H04H 20/59* | (2008.01) |
| *G01W 1/02* | (2006.01) |
| *G01W 1/10* | (2006.01) |
| *H04L 12/58* | (2006.01) |

(Continued)

(52) U.S. Cl.
CPC ............... *H04H 20/59* (2013.01); *G01W 1/02* (2013.01); *G01W 1/10* (2013.01); *H04L 12/1845* (2013.01); *H04L 12/1895* (2013.01); *H04L 51/14* (2013.01); *H04L 67/02* (2013.01); *H04L 67/12* (2013.01); *H04L 67/20* (2013.01); *H04L 67/26* (2013.01); *H04L 67/322* (2013.01)

(58) Field of Classification Search
USPC .......................................................... 709/207
See application file for complete search history.

(56) References Cited

U.S. PATENT DOCUMENTS

| | | | | |
|---|---|---|---|---|
| 4,582,491 | A | * | 4/1986 | Monteith .................. 434/218 |
| 5,850,619 | A | * | 12/1998 | Rasmussen et al. .......... 702/3 |
| 6,405,134 | B1 | | 6/2002 | Smith et al. |

(Continued)

*Primary Examiner* — Richard G Keehn
(74) *Attorney, Agent, or Firm* — Leveque Intellectual Property Law, P.C.

(57) ABSTRACT

A method, system, and device provide alert information using weather prediction data. The method includes: converting weather prediction data to a tile based tile set, the tiles each representative of a unique geographic projection of a rendered geographical area of defined size; determining for each time period of the forecast whether any of the one or more weather variables associated with each prediction geographical tile violates a weather variable threshold for the location associated with the prediction geographical tile, the determining performed by comparing for each time period of the forecast each weather variable of the one or more weather variables associated with the prediction geographical tile to the weather variable threshold for the location associated with the prediction geographical tile; and generating and communicating one or more alerts corresponding to one or more violations of the weather variable thresholds for the locations associated with the prediction geographical tiles.

32 Claims, 31 Drawing Sheets

(51) Int. Cl.
*H04L 12/18* (2006.01)
*H04L 29/08* (2006.01)

(56) References Cited

U.S. PATENT DOCUMENTS

| | | | |
|---|---|---|---|
| 6,496,780 B1 * | 12/2002 | Harris et al. | 702/3 |
| 6,581,009 B1 | 6/2003 | Smith | |
| 6,590,529 B2 | 7/2003 | Schwoegler | |
| 6,646,559 B2 | 11/2003 | Smith | |
| 6,947,842 B2 | 9/2005 | Smith et al. | |
| 6,963,853 B1 | 11/2005 | Smith | |
| 7,069,258 B1 * | 6/2006 | Bothwell | 706/21 |
| 7,191,064 B1 * | 3/2007 | Myers et al. | 702/3 |
| 7,268,703 B1 * | 9/2007 | Kabel et al. | 340/984 |
| 7,788,029 B2 * | 8/2010 | Nagase et al. | 701/422 |
| 8,024,112 B2 * | 9/2011 | Krumm et al. | 701/423 |
| 8,320,873 B2 * | 11/2012 | Sennett et al. | 455/404.1 |
| 2002/0004705 A1 * | 1/2002 | Baron et al. | 702/3 |
| 2002/0016677 A1 * | 2/2002 | Baron et al. | 702/3 |
| 2003/0093530 A1 * | 5/2003 | Syed | 709/226 |
| 2003/0120426 A1 * | 6/2003 | Baron et al. | 702/3 |
| 2005/0039787 A1 * | 2/2005 | Bing | 136/243 |
| 2005/0154531 A1 * | 7/2005 | Kelly et al. | 702/3 |
| 2007/0008109 A1 * | 1/2007 | Wang | 340/539.11 |
| 2007/0049260 A1 * | 3/2007 | Yuhara et al. | 455/414.3 |
| 2007/0073477 A1 * | 3/2007 | Krumm et al. | 701/209 |
| 2007/0100542 A1 * | 5/2007 | Courtney et al. | 701/208 |
| 2007/0150185 A1 * | 6/2007 | Nagase et al. | 701/209 |
| 2007/0252688 A1 * | 11/2007 | Eisold et al. | 340/506 |
| 2007/0275742 A1 * | 11/2007 | Zhang | 455/466 |
| 2007/0296575 A1 * | 12/2007 | Eisold et al. | 340/539.16 |
| 2008/0109317 A1 * | 5/2008 | Singh | 705/14 |
| 2008/0225848 A1 * | 9/2008 | Pilon et al. | 370/390 |
| 2009/0273713 A1 * | 11/2009 | Goldman et al. | 348/563 |
| 2009/0309742 A1 * | 12/2009 | Alexander et al. | 340/601 |
| 2010/0082307 A1 * | 4/2010 | Dorum et al. | 703/2 |
| 2010/0162300 A1 * | 6/2010 | Velazquez et al. | 725/33 |
| 2010/0211971 A1 * | 8/2010 | Howarter et al. | 725/33 |
| 2010/0211972 A1 * | 8/2010 | Howarter et al. | 725/33 |
| 2010/0306154 A1 * | 12/2010 | Poray et al. | 706/47 |
| 2010/0321178 A1 * | 12/2010 | Deeds | 340/539.1 |
| 2011/0159837 A1 * | 6/2011 | Daly et al. | 455/404.1 |
| 2013/0338920 A1 * | 12/2013 | Pasken et al. | 702/3 |
| 2014/0087780 A1 * | 3/2014 | Abhyanker et al. | 455/521 |

\* cited by examiner

Registration Flow

MULTIMEDIA ALERTING

PRIORITY CLAIM

This application is a continuation-in-part application that claims priority to U.S. Utility patent application Ser. No. 14/335,213 filed Jul. 18, 2014, which in turn claims priority to U.S. Utility patent application Ser. No. 13/082,236 filed Apr. 7, 2011 that issued as U.S. Pat. No. 8,788,606 on Jul. 22, 2014, and U.S. Provisional Patent Application No. 61/322, 640 filed Apr. 9, 2010, which are hereby incorporated herein by reference in their entireties.

BACKGROUND

NOAA Weather Radio is a service of the National Oceanic and Atmospheric Administration (NOAA) of the U.S. Department of Commerce. As the "Voice of the National Weather Service", it provides continuous broadcasts of the latest weather information from local National Weather Service offices. Weather messages are repeated every 4 to 6 minutes, and are routinely updated every 1 to 3 hours or more frequently in rapidly changing local weather, or if a nearby hazardous environmental condition exists. The service operates 24 hours daily. The regular broadcasts are specifically tailored to weather information needs of the people within the service area of the transmitter. For example, in addition to general weather information, stations in coastal areas provide information of interest to mariners. Other specialized information, such as current conditions and forecasts, may be broadcast.

During severe weather, National Weather Service forecasters can interrupt the routine weather broadcasts and insert special warning messages concerning imminent threats to life and property. The forecaster can also add special signals to warnings that trigger "alerting" features of specially equipped receivers. This is known as the tone alert feature, and acts much like a smoke detector in that it will alarm when necessary to warn of an impending hazard. Currently, all receivers equipped with the tone alert feature within the listening area will alarm when a warning is issued. However, in the future, only receivers located in the warned area (normally a specific county or counties) will alarm. This feature is referred to as Specific Area Message Encoding (SAME), and will be the primary activator for the new Emergency Alert System currently being implemented by the Federal Communication Commission.

Under a January 1975 White House policy statement, NOAA Weather Radio was designated the sole government-operated radio system to provide direct warnings into private homes for both natural disasters and nuclear attack. This concept is being expanded to include warnings for all hazardous conditions that pose a threat to life and safety, both at a local and national level. NOAA Weather Radio currently broadcasts from over 400 FM transmitters on seven frequencies in the VHF band, ranging from 162.400 to 162.550 megahertz (MHz) in fifty states, Puerto Rico, the Virgin Islands, Guam, and Saipan. These frequencies are outside the normal AM or FM broadcast bands.

Special radios that receive only NOAA Weather Radio, both with and without the tone alert feature, are available from several manufacturers. The radios can usually be found at most department and electronics stores. In addition, other manufacturers are including NOAA Weather Radio as a special feature on an increasing number of receivers. NOAA Weather Radio capability is currently available on some auto-mobile, aircraft, marine, citizens band, and standard AM/FM radios, as well as communications receivers, transceivers, scanners, and cable TV.

By nature and by design, NOAA Weather Radio coverage is typically limited to an area within 40 miles, using 500 watt transmitters, of the transmitter. The quality of what is heard is dictated by the distance from the transmitter, local terrain, and the quality and location of the receiver. In general, those on flat terrain or at sea, using a high quality receiver, can expect reliable reception far beyond 40 miles. Those living in cities surrounded by large buildings, and those in mountain valleys, with standard receivers may experience little or no reception at considerably less than 40 miles. If possible, a receiver should be tested in the location where it will be used prior to purchase.

NOAA Weather Radio is directly available to approximately 70 to 80 percent of the U.S. population. The National Weather Service is currently engaged in a program to increase coverage to 95 percent of the population.

Using an existing NOAA issued weather radio; the user of this service is required to tune the weather radio to a given frequency based on their location before the radio will work. Once working, the weather radio will notify the users covering an area of approximately 40 miles radius from the transmitter, see the NOAA Weather Radio coverage maps at http://www.weather.gov/nwr/Maps/. Currently, the NOAA Weather Radio Network includes 1000 transmitters, covering all 50 states, adjacent coastal waters, Puerto Rico, the U.S. Virgin Islands, and the U.S. Pacific Territories.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
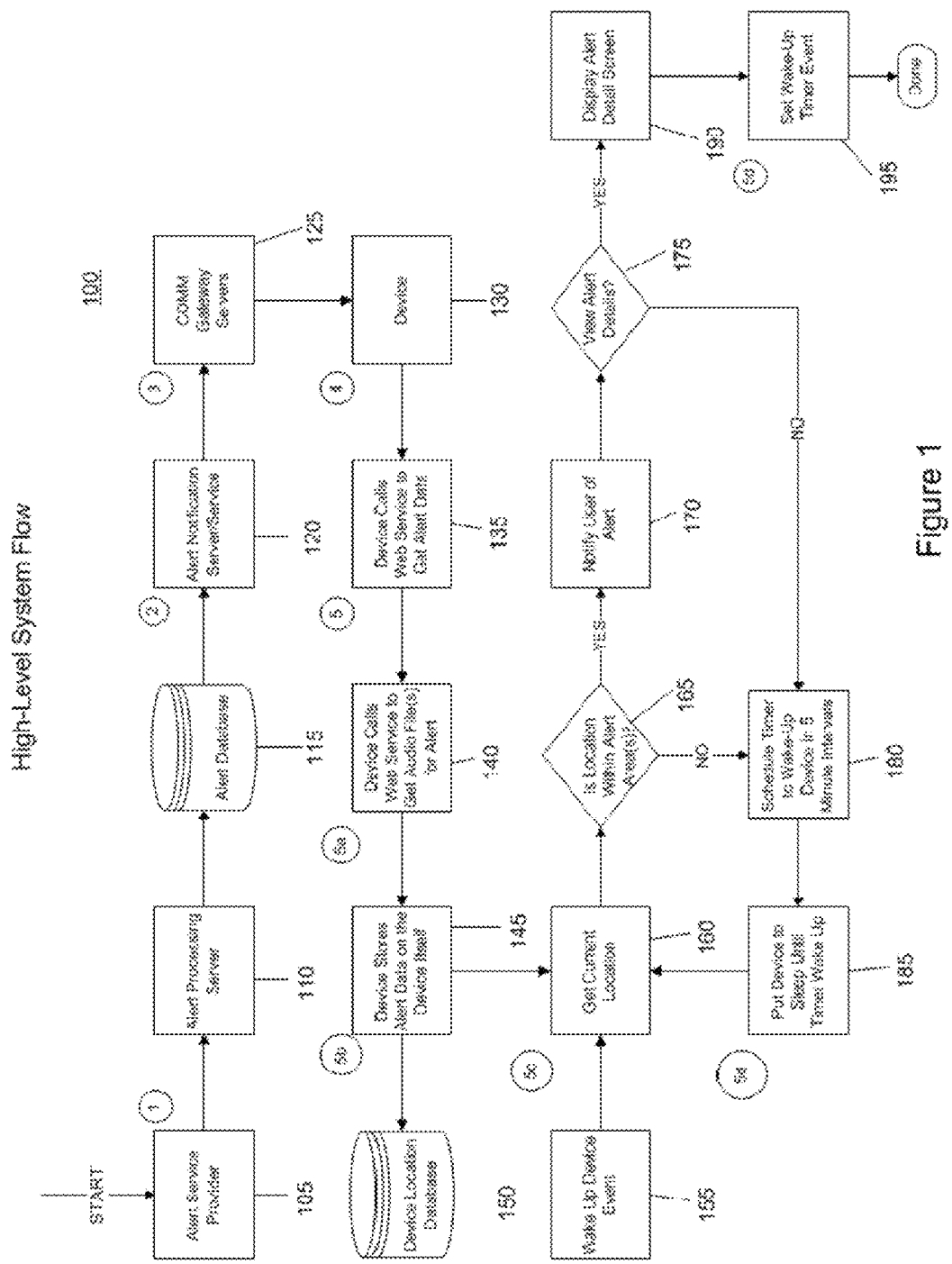
FIG. 1 is a flowchart of a high-level system flow, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

INTRODUCTION

Due to the large percentage of mobile device users, especially with the significant increase in the use of Smart phones, mobile devices provide an excellent vehicle for delivering severe warning messages of impending severe weather or other hazards to the public. In addition to this, most new mobile phones possess the capability to determine their device location within less than 1 km accuracy. This is enough resolution to make use of the United States National Oceanic and Atmospheric Administration (NOAA) severe warning system and other weather and hazard warning systems to determine if the location of the device is in such a hazard. In addition to mapping severe weather alerts, this System can map the DMA (Direct Marketing Area) of the device to local television and/or radio broadcasters that might have even more information for the user about the severity of the conditions and how the conditions might affect them.

Given those facts, the Multimedia Alerting method, system, apparatus, and device as described in embodiments herein provide the ability to convert mobile devices into a video, audio and/or textual severe weather early warning devices and to allow local television and/or radio broadcasts to be directed to a user of a mobile device in times of impending danger.

Multimedia alerting is designed to support high-end mobile phones, smart phones, and other portable computing devices that can obtain its location, has access to an Internet data source, and has the capability to at least render digital audio and possibly also video alert information to the user of the device.

It is noted that while the use of portable, mobile devices, such as cellular telephones, mobile phones, smart phones, and the like are discussed, the embodiments described herein are not limited to usage with mobile devices. Any location-enabled device for which location can be determined, including stationary devices and/or vehicles and assets or objects of interest, are compatible with the embodiments described herein. These devices will have at least an audio capability of delivering and providing messages via a user interface having audio capabilities regarding weather conditions and non-weather conditions relevant to one or more locations of interest which may or may not be the location of the device itself, as will be described. These devices may also have a video/visual capability of delivering and providing messages via a user interface having audio and/or visual capabilities regarding weather conditions and non-weather conditions relevant to one or more locations of interest.

Therefore, in accordance with various embodiments disclosed herein, a method of providing alert information to a user of a device comprises: in response to an alert notification of an alert, determining one or more alert geographical tiles of interest that are affected by the alert of a plurality of geographical tiles, wherein each geographical tile of the plurality of geographical tiles represents a unique geographic projection of a rendered geographical area of defined size; determining one or more location-enabled devices each having a location that falls within an alert geographical tile of the one or more alert geographical tiles; retrieving a portion of the alert from an alert database and processing the portion of the alert to generate a media version of the alert; constructing an alert text notification of the alert having the text portion of the alert, an alert identifier of the alert, a reference identifier for the media version of the alert, the one or more alert geographical tiles, and the one or more one or more device identifiers for each of the one or more devices; and retrieving the one or more device identifiers for each of the one or more devices, the alert text notification and the alert identifier of the alert and transmitting the alert text notification to the one or more devices corresponding to the retrieved one or more device identifiers. A device of the one or more devices may receive and process the alert text notification and request to receive alert data of the alert. Received alert data of the alert may be presented to a user of the device through a user interface of the device.

Moreover, in accordance with various embodiments disclosed herein, a method of providing alert information to a user of a device comprises: an alert service provider transmitting an alert notification of an alert to an alert processing server; storing the alert notification in an alert database coupled to the alert processing server; an alert notification server retrieving the alert notification from the alert database and determining one or more alert geographical tiles of interest that are affected by the alert of a plurality of geographical tiles, wherein each geographical tile of the plurality of geographical tiles represents a unique geographic projection of a rendered geographical area of defined size; the alert notification server determining one or more location-enabled devices each having a location that falls within an alert geographical tile of the one or more alert geographical tiles; retrieving a text portion of the alert from the alert database and processing the text portion of the alert to generate an audio version of the alert; constructing an alert text notification of the alert having the text portion of the alert, an alert identifier of the alert, a reference identifier for the audio version of the alert, the one or more alert geographical tiles and the one or more one or more device identifiers for each of the one or more devices and storing the alert text notification into an alert notification queue; and a gateway server retrieving the one or more device identifiers for each of the one or more devices, the alert text notification and the alert identifier of the alert from the alert notification queue and transmitting the alert text notification to the one or more devices corresponding to the retrieved one or more device identifiers. A device of the one or more devices may receive and process the alert text notification and request to receive alert data of the alert. Received alert data of the alert may be presented to a user of the device through a user interface of the device.

Alert Types

The types of alert notifications that are supported by the various embodiments described herein include, but are not limited to: Weather Alerts, Lightning Alerts, Lightning Prediction Alerts, Traffic Alerts, and Emergency Alert Service (EAS) Service Network just to name a few possibilities.

Weather Alerts

A Weather Alert Service Provider may receive weather alerts and notifications from The National Weather Service of the United States or other sources, such as a Lightning detection system, weather forecast system, disaster/emergency alert services or other sources. These alerts are delivered in encoded text from the Alert Service Provider or System. The encoded text includes information relating to the severity of the alert, the type of phenomena or event that the alert represents, text describing the alert, the watch/warning boxes of the alert, a beginning time (estimated time of arrival (ETA)), an ending time (estimated time of departure (ETD)), and the current area effected by the phenomena.

Audio Alerts

Audio alerts are designed to mimic the voice audio supplied by a National Weather Service Weather Radio when a device user needs to be notified of severe weather, traffic, current weather conditions, weather forecasts, special public notices, or emergency conditions.

Audio Alert Types

There are at least two (2) types of audio available for alerts. One is statically generated audio that is 'baked into' the mobile applications and the other is a Text-to-Speech converted MP3 audio file that reads the header of the alert and/or reads the full alert text to the user. Audio Alerts do not necessarily need to be limited to weather alerts. They could include traffic alerts, public alert notifications, disaster warnings, and many more public notifications.

Generation of Audio Alerts

The audio alerts are generated by a Text-to-Speech engine, such as a third-party Text-to-Speech engine and provided to a user of a device by an alert software program or software application, also referred to as an Alert Application, a Back-end Application, or simply an "App", running on the Device. A Text-to-Speech engine supplies the Text-to-Speech conversion service through an Application Programming Interface (API) with which an application running on the Device may interface. This interface will allow the Alert Message or Service Provider to modify voice, speed, and inflection of the voice to be rendered by the application with supplied text. Each voice is also language dependant.

Also, please note when converting from Text-to-Speech the text must be first processed to replace any abbreviated text with full word versions of the abbreviation. For instance, "Feb" should be converted to February; "CDT" should be converted to "Central Daylight Time", as examples. These abbreviations that are commonly contained in alert text and include, but are not limited to: time zones, countries, hours, minutes, and days of the week, months, and states. Other phonetic modification may need to be made depending on the quality of the voice. Thus, a word prone to mispronunciation can be modified to match phonetically to the intended speech. For example, the spelling of the word "wind" may be modified to match phonetically to the intended speech, so that "wind" is converted to "wend".

Caching Audio Alerts

The Audio Alerts cache lifespan should match the life expectancy of the alert as defined in the data supplied by the alert source. A background task should be set to purge the audio files cached at configurable time that balances between server load and space available. The initial recommendation is to set the background task to run every hour, for example.

EAS/FEMA/Civil Defense/Homeland Security Alerts

The EAS alerts are delivered to the Weather Alert Service Provider as aggregated information by the National Weather Service contained within their alert bulletins. This information is parsed in the same manner as the Weather Alerts received from the National Weather Service. A Weather Alert Service Provider may combine data from multiple sources, such as the United States Geological Survey for Earthquake and Volcanic alerts, the United States Department of Justice for child abduction alerts, and the United States Department of Homeland Security for public security alerts.

In addition to this, the alerting system of a Weather Alert Service Provider may include alerts on a global basis.

Traffic Alerts

A user traveling along a highway could also be notified by both audible and/or visual alerts to changes in traffic conditions along a route, such as road work ahead, traffic slowing ahead, and other tests. This would also be defined by using tile and magnetic heading of the device.

The Alert Geographic Tile System

This alert system is based on identifying alert-affected areas in "Tiles" where each tile is defined as a geographic area identified by a "Tile Code".

Overview of Tiles

The Multimedia Alerting System is designed to provide an enhanced alerting feature set and expand the scope of alerts beyond traditional text-based severe weather text alerting products. One of the primary features of this alerting system is to reduce the number of "false alarms" received by the end-user. In order to accomplish this, the geographic grouping that matches alerts with the recipients of an alert is not based on traditional city, state, or county boundaries, in which actual latitude/Longitude polygons are provided for the affected area for a given alert. Due to the high volume of traffic that this alert system will process, this system cannot handle the computational complexity of attempting to determine if a recipients' location falls within a polygon using traditional means.

Based on these requirements, a tile coding system was developed to allow a backend alert software application to use a simple database query to determine what recipients should receive alerts based on a static (non-changing location, such as, a hospital or school) or dynamic (changeable location, such as, a tracked mobile device) location of interest. A recipient who should receive an alert may be a user of a device having location represented by a tile code of interest or the recipient may be a person interested in a tile code of interest even if their physical device is not itself located in the tile code of interest. These tile codes are used between the server and client device to represent a unique geographic projection of a rendered geographical area of defined size. The unique geographic projection may be a Mercator or other geographical projection rendered box or Tile, approximately 2 sq km in size, for example.

To accomplish this, a tile coding system was developed to allow communications between the server and client device, while maintaining an approximate 2 km (approximately 1.2 mile) accuracy, which we finally chose a representation of a Mercator box or Tile based on 1 arc minute of latitude and longitude within a text string. This allows the entire planet to be divided into an even number of sections or Tiles that can be quickly searched by a database while maintaining a reasonable resolution to be useful for weather alerting.

Tile Code Algorithms

In order to understand the concept of the tile code and its resolution one must first understand the length of a degree and arc minute on the planet. An arc minute, upon which the tile code is based, represents a square box or Tile on a Mercator projection of the curved planet. In reality, a one (1) arc minute by one (1) arc minute box is not a square but a four sided polygon in which all of the sides are slightly curved. But for the purposes of this document, the arc minute or Tile will be represented in its Mercator square form.

Degree and "Arc Minute" Length

The length of an arc degree of north-south latitude difference, $\Delta\phi$, is about 60 nautical miles, 111 kilometers or 69 statute miles at any latitude; more exactly, a degree of latitude at the pole covers about 1 percent more distance than a degree at the equator. The length of an arc degree of east-west longitude difference, roughly $\cos(\phi)\Delta\lambda$, is about the same at the Equator as the north-south, reducing to zero at the poles.

In the case of a spheroid, a meridian and its anti-meridian form an ellipse, from which an expression for the length of an arc degree of latitude is:

$$\left(\frac{\pi}{180}\right)M(\varphi)$$

This radius of arc (or "arc radius") is in the plane of a meridian, and is known as the meridional radius of curvature, M. Similarly, an expression for the length of an arc degree of longitude is:

$$\left(\frac{\pi}{180}\right)\cos(\varphi)N(\varphi)$$

The arc radius contained here is in the plane of the prime vertical, the east-west plane perpendicular (or "normal") to both the plane of the meridian and the plane tangent to the surface of the ellipsoid, and is known as the normal radius of curvature, N.

Along the Equator, east to west, N equals the equatorial radius. The radius of curvature at a right angle to the Equator, north to south, M, is 43 km shorter, hence the length of an arc degree of latitude at the Equator is about 0.7 km less than the length of an arc degree of longitude at the Equator. N and M are equal at the poles, where they are about 64 km greater than the north-south equatorial radius of curvature because the polar "radius" is 21 km less than the equatorial radius. The shorter polar "radii" indicate that the northern and southern hemispheres are flatter, making their radii of curvature longer. This flattening also 'pinches' the north-south equatorial radius of curvature, making it 43 km less than the equatorial radius. Both radii of curvature are perpendicular to the plane tangent to the surface of the ellipsoid at all latitudes, directed toward a point on the polar axis in the opposite hemisphere (except at the Equator where both point toward Earth's center). The east-west radius of curvature reaches the axis, whereas the north-south radius of curvature is shorter at all latitudes except the poles.

The WGS84 ellipsoid, used by all GPS devices, uses an equatorial radius of 6378137.0m and an inverse flattening, (1/f), of 298.257223563, hence its polar radius is 6356752.3142m and its first eccentricity squared is 0.00669437999014. The more recent but little used IERS 2003 ellipsoid provides equatorial and polar radii of 6378136.6 and 6356751.9m, respectively, and an inverse flattening of 298.25642. Lengths of degrees on the WGS84 and IERS 2003 ellipsoids are the same when rounded to six significant digits. An appropriate calculator for any latitude is provided by the U.S. government's National Geospatial-Intelligence Agency (NGA).

Another approximation of a longitudinal degree at latitude $\phi$, is:

$$\left(\frac{\pi}{180}\right)a\cos(\beta)$$

where Earth's equatorial radius a equals 6,378,137 m and $$\tan\beta = \frac{b}{a}\tan\varphi,$$

for the GRS80 and WGS84 spheroids, b/a calculates to be 0.99664719. ($\beta$ is known as the parametric or reduced latitude).

This gives the same distance as the formula above, which (aside from rounding) is the exact distance along a parallel of latitude; getting the distance along the shortest route will be more work, but those two distances are always within 0.6 meter of each other if the two points are one degree of longitude apart.

| Latitude | Surface distance per 1° change in Latitude | Surface distance per 1 minute change in Latitude | Surface distance per 1° change in Longitude | Surface distance per 1 minute change in Longitude |
|---|---|---|---|---|
| 0° | 110.574 km | 1.843 km | 111.320 km | 1.855 km |
| 15° | 110.649 km | 1.844 km | 107.551 km | 1.793 km |
| 30° | 110.852 km | 1.848 km | 96.486 km | 1.608 km |
| 45° | 111.132 km | 1.852 km | 78.847 km | 1.314 km |
| 60° | 111.412 km | 1.857 km | 55.800 km | 0.930 km |
| 75° | 111.618 km | 1.860 km | 28.902 km | 0.482 km |
| 90° | 111.694 km | 1.862 km | 0.000 km | 0.000 km |

Converting Longitude and Latitude to Tile Codes

Since the resolution of 1 arc minute×1 arc minute is being used to represent a tile (approximately 1.8 km×1.8 km at the equator), the tile unit of the X-Y Cartesian coordinate system will start from latitude 0 degrees and longitude 0 degrees. The range of the contiguous United States (CONUS) domain ranges from 130° to 60° W longitude and 25° to 50° N latitude. This yields 4200×1500 possible tiles to cover the United States and 21,600×21,600 tiles to cover the entire planet. Furthermore, many of these tiles, approximately 70 percent, would almost never be used since terrain such as desert, tundra, and water-covered areas are not inhabited.

1. X-Y Cartesian coordinate system
   a. Unit: minute
   b. X axis: longitude
   Y axis: latitude
   Origin: a given ($lat_O$, $lon_O$) will be set to (latitude 0 degrees and longitude 0 degrees)
2. Longitude conversion to the Tile X coordinate
   The Tile X coordinate represents the longitude, starting at longitude 0 (Greenwich mean) and wrapping around the globe.
   Case 1
   If the longitude is positive (East), then
   Tile X=longitude*60
   For example, where longitude=35°
   Tile X=longitude*60=02100
   Case 2
   If the longitude is negative (West), then
   Tile X=(longitude+360°)*60
   For example, where longitude=−125°
   Tile X=(longitude+)*360°*60=14100
3. Latitude conversion to Tile Y coordinate
   The Tile X coordinate represents the longitude, starting at longitude 0 (Greenwich mean) and wrapping around the globe.
   Tile Y=(latitude+90°)*60
   For example, where latitude=−65°
   Tile Y=(latitude+90°)*60=01800
4. Longitude/Latitude Grid (LLG) tile name
   Format:
   $LLGX_1 X_2 X_3 X_4 X_5 Y_1 Y_2 Y_3 Y_4 Y_5$
   Value:
   $X_1 X_2 X_3 X_4 X_5$ is the 5 digit representation of the tile's longitude coordinate (in minutes) of its low-left corner in a Mercator projection in accordance with certain embodiments.
   $Y_1 Y_2 Y_3 Y_4 Y_5$ is the 5 digit representation of the tile's latitude coordinate (in minutes) of its low-left corner in a Mercator projection in accordance with certain embodiments.
5. Procedure of processing clients' longitude and latitude coordinates
   Convert longitude to Tile X coordinate
   Convert latitude to Tile Y coordinate
   Use the converted Tile X and Tile Y coordinates to construct the Tile Name (i.e.
   LLG1410001800 using the example above)

Example

A location where the longitude is 97.797° West and the Latitude is 35.772° North in Oklahoma and the result would be LLG1573207546.

6. Procedure of retrieving a devices' approximate location from the LLG tile is simply to reverse the process.

Converting National Weather Service (NWS) Universal Geographic Codes to Tile Codes Since the National Weather Service issues alerts based on VTEC bound boxes, Zone codes or County codes, the Alert Service will need to convert the geographic areas into a collection of "Tiles" used to approximately represent the alert locations.

In the cases of UGC Zone and county codes, these are done by preprocessing a vector-based "shape file", which can be found at http://www.nws.noaa.gov/geodata/catalog/wsom/html/pubzone.htm, that represents the National Weather Service UGC (Universal Geographic Code) locations for all known locations and generating tiles and storing them into a database that cross references the UGC code to a collection of tiles. This way alert requests received to the server will take the alert UGC code and perform a database query that matches the UGC codes and retrieves "Tile" codes. These tile codes are then in turn used to perform queries on the Target device and location database, which is indexed by Tile Codes to retrieve target alerting devices to receive notifications in turn alerting the user of those devices. This will maintain accuracy within 2 miles of the target location while maintaining high speed response time to a larger volume of devices.

Figure 11:
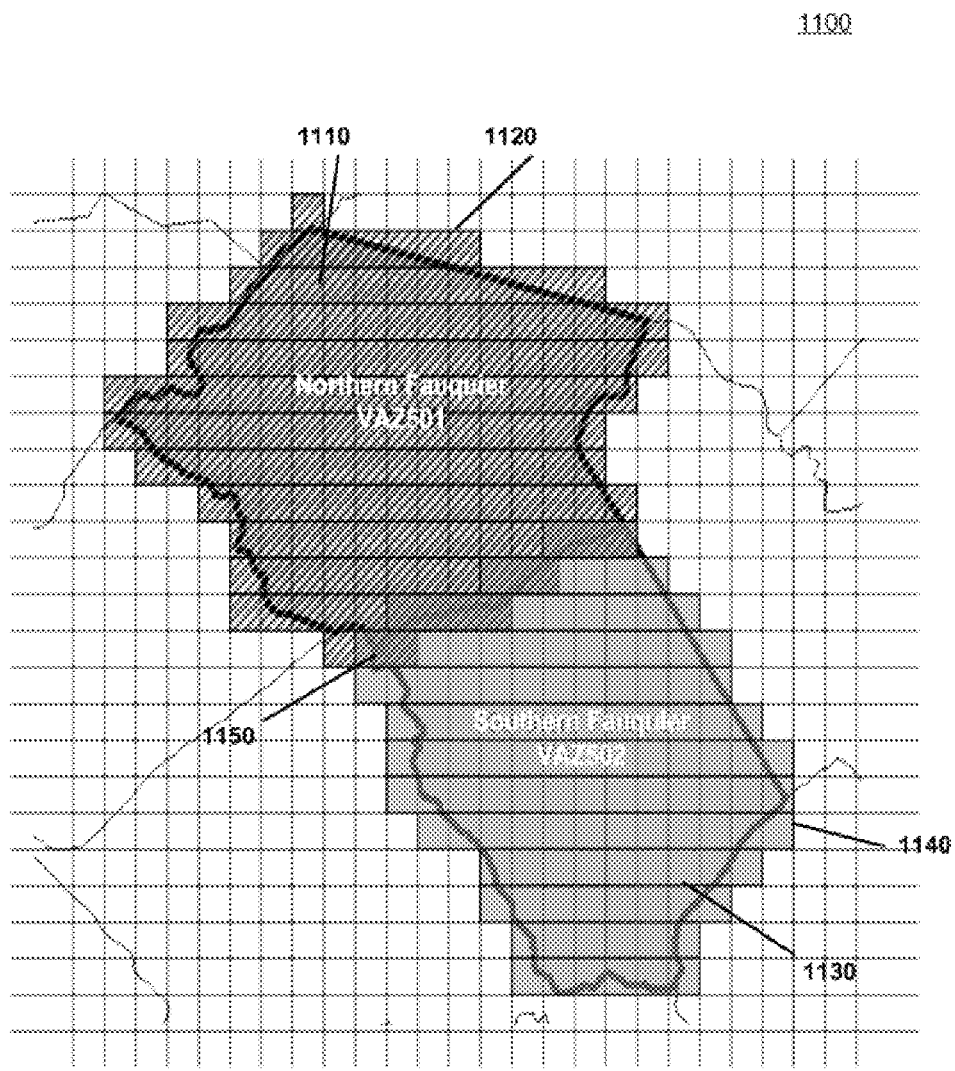
FIG. 11 illustrates a tile grid overlay over a map image, in accordance with various representative embodiments.

The illustration of FIG. 11 shows two (2) UGC areas (VAZ501 and VAZ502) with an example of a tile grid overlay over the image. The map area 1110 designates the VAZ501 area and the map area 1130 designates the VAZ502 area. Each of the tiles overlaying at least a portion of a map area would be associated with the corresponding UGC areas. Thus it can be seen that the tiles of the collection of Tiles 1120 overlay or border at least a portion of the VAZ501 area, while the tiles of the collection of Tiles 1140 overlay or border at least a portion of the VAZ502 area. As shown below also, there are several tiles 1150 on the border of these areas that belong to both UGC areas.

In the case of VTEC bounding boxes, a VTEC polygon is approximately converted into a collection or set of tiles using the maximum and minimum latitude and longitude construct a collection of Tile Codes associated with the VTEC alert. Once this is done, the Tiles are further reduced to closely match the polygon before the query to the database is made. The result of the database query yields a collection of tiles that can yield alerting device described in the previous paragraph.

Functional Description

Certain embodiments described herein use a device, such as a mobile device, with Location Based Services, a Device Location Database, a Notification Server/Services that pushes notification to a device (such as by way of example and not limitations, SMS and/or Push notification services like the Apple Push Notification Service), Alert Servers, and Text-to-Speech Server. Below is a flow of events that further describe the methodology, system, apparatus and device functionality.

An exemplary high-level system flow diagram is shown in system 100 of FIG. 1. System Flow diagram 100 of FIG. 1 illustrates the flow that an alert notification, also referred to as a message, text message, notification or a notification message, follows through the system 200 of FIG. 2. Note that the encircled numerals 1, 2, 3, 4, 5a, 5b, 5c, and 5d in FIG. 1 correspond to the flow numerals below:

1. The Alert Service Provider 105 sends the notification to Alert Processing Server 110 of the system 100 that an Alert is issued by a system, agency, or data provider. This notification is received by the system and stored in the Alert Database 115.
2. The Alert Service Notification Server/Service 120 is notified by the Alert Database 115 that a message was stored.

a. The Alert Service Notification Server 120 retrieves the Alert from the Alert Database 115 and determines what "Tile Codes" are representative of tiles affected by the Alert.
b. The Alert Service Notification Server 120 then retrieves from the Alert Database 115 a listing of all of the devices that are looking for notifications in the affected tiles of the Alert. This may be accomplished by a simple database query of the Tile Codes associated with the locations of one or more registered Devices that are stored in the Alert Database.
c. The Alert Notification Server 120 then formats the text of the Alert, processes the Text-to-Speech conversions of the Alert and stores a link to the audio file of the Alert within the Alert Database 115.
d. The Alert Notification Server 120 then formats the alert text and places a text notification, an alert identifier (ID) and the device identifiers (IDs) of the one or more of the identified target devices into an alert notification queue to be retrieved by the Communications Gateway (COMM Gateway) Server(s) 125 to deliver the text message to the one or more affected target device(s) 130 located within the Tiles of interest that are affected by the Alert. While a text portion of the alert may be processed to generate or associate an audio version of the alert, other portions of the alert may be processed to generate a media version of the alert and said media versions of the alert could include text, audio, video (moving imagery), and photos (still imagery). In such a case, a retrieved portion of the alert is processed to generate or associate a media version of the alert and a reference identifier of the media version of the alert is placed into the alert notification queue.
3. The COMM Gateway Server(w) 125 retrieves the target device identifier (ID) for each of the one or more affected target Devices 130, alert text, and alert ID from a queued message and transmits the message using push notification services, Simple Messaging Services (SMS), or other text transmission mediums to the target Device(s) 130.
    a. In the case that the transmission fails, the COMM Gateway Server(s) 125 will try an alternate method of delivery if defined in the queue managed by the Alert Notification Server 120.
        i. An example would be a case in which a message is to be delivered to a Device 130 using the Apple Push Notification Service (APNS); the message could have in the Alert Database 115 a defined alternate method available such as Simple Messaging Service (SMS). In the example case, the COMM Gateway Servers 125 would attempt to read the database using the device ID and determine if an alternate method of delivery is defined, in this case SMS, and place the message into the appropriate queue to be sent to the Device 130.
4. Once the Device 130 receives the alert text notification message, the device will process the text message at the operating system level and notify the alert applications of the Device that have registered to receive messages from the device notification service provided by the Alert Notification Server 120.
5. The Device 130 will then process the text message, which will include the alert text, affected Tile(s) and alert identifier at a minimum. As shown in Block 135 of the drawing, the Device 130 may call a web-based service to obtain the alert data.
    a. The application operating on the mobile device will download the complete alert information from a server using the provided alert identifier. As shown in Block 140 of the drawing, the Device 130 may call a web-based service to obtain audio file(s) for the Alert.
    b. The alert information is cached locally on the device for future reference, either in file or database form, in the Device Database 150 as shown at Block 145.
    c. If the Device 130 or a location monitored by the user of the Device 130 is in the affected area of the Alert, then:
        i. The alert text will be shown to the user.
        ii. Alert audio of the Alert will be played, if supported and supplied
        iii. If a user requests, the text version of the Alert will also be available for viewing along with a geographical map representation of the affected area of the Alert.
    It can be seen from the drawing that the current location of the Device 130 is obtained at Block 160; this may occur after a wake-up device event at Block 155. If the determined device location is within the affected Alert area(s), as determined at Decision Block 165, then the user is notified of the Alert at Block 170 and given the opportunity at Decision Block 175 to decide whether to view the Alert details. The Alert details may be displayed to the viewer/user at Block 190 via a display Alert detail screen, various embodiments of which are discussed below and illustrated in the drawings. If the user does not wish to view Alert details, then the flow from Decision Block 175 continues to Block 180, where a timer can be set to wake-up the Device at intervals, such as five minute intervals.
    d. A timer of the Device is set for a configurable amount of time and then step 5c is performed again, as reflected at Blocks 185 and 195.

As used herein, the terms service and server may be used interchangeably. For example, an Alert Processing Service may make use of an Alert Processing Server and the Alert Processing Server itself may provide the Alert Processing Service. A similar observation may be made about Alert Notification Server and Alert Notification Service.

Figure 2:
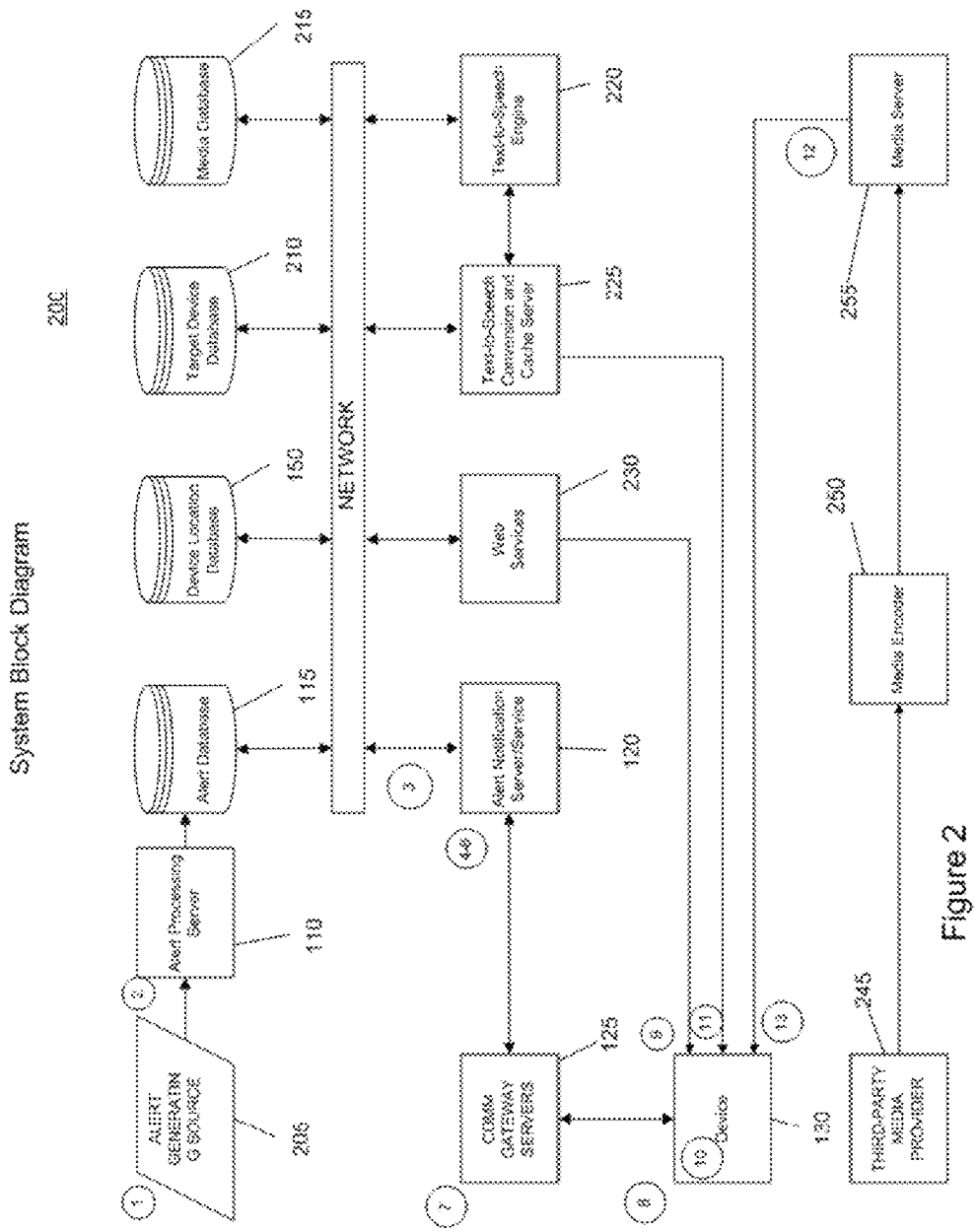
FIG. 2 is a block diagram of a system, in accordance with various representative embodiments.

A system block diagram is shown in FIG. 2. With reference to the system flow of FIG. 1 and the System Block Diagram 200 of FIG. 2, the following functional descriptions are consistent with certain embodiments described herein. Note that the encircled numerals 1-12 in FIG. 2 correspond to the flow numerals below:

1. At Block 205 the Alert Generating Source 205 is generated by an alerting agency and transmitted to the Alert Service Provider, shown as 110 in FIG. 1. The information contained in the alert will contain, but is not limited to, text representation of the alert event, location(s) associated with the alert event, start time and stop time of the alert event, and the severity of the alert event.
2. The Alert is processed by the Alert Processing Server 110 and stored in an Alert Database 115, which is used to prepare the alerts for being transmitted to one or more target Devices 130.
3. The Alert Notification Server/Service of Block 120 is triggered to read the Alert database 115 when a new alert is inserted by the Alert Processing Server 110.
4. The Alert data is then compared to Target Devices located in the Target Device Database 210, which is cross-referenced to the Device Location Database 150. If the Target Device 130 has a static location then the location is not cross-referenced, but used by the Alert Notification Server 120 to send the alerts. The Alert data may be payload information regarding one or more alerts that is sent from COMM Gateway Servers 125 to a device, for example.

5. Each target device entry of the Target Device Database 210 also has a corresponding device 130 that requested the alert, which will be used as the delivery device identifier when transmitting the alert to the Communication Gateway Server(s) 125.
6. The transmitted Alert data will contain an event identifier and basic text to identify the alert.
7. The Communication Gateway Servers 125 then take the transmitted alert and deliver the Alert data to the device 130.
8. The Device takes the Alert information received from the COMM Gateway Servers 125 and extracts the event Alert identifier (ID).
9. The Device requests additional event information from the Web Services 230 about the alert, which contains location specific information and time specific information about the Alert.
10. The Device then stores the collected information into a local device database.
11. The alert is displayed to the user, then the device will retrieve the media file(s) associated with the alert from the Text-to-Speech Cache server 225 and render the audio to the user using the Text-to-Speech Engine 220. The user is then given the option to view additional media provided by third-party media provider or vendors. The metadata associated with such third-party vendors is downloaded from the Media Server and rendered to the user for selection. Media available for viewing may be stored in Media Database 215.
12. Once third-party media is requested from the Media Server 255 based on the affected alert "Tile Code," the Device 130 will download a list of available alert media (such as photos or still imagery, video or moving imagery text, or audio) from the Media Server 255. The media may additionally include metadata, pre-formed data blocks (including proprietary data blocks), and photos or videos with tags for text and location, for example.
13. In the event that the user selects media to view from the list retrieved from the Media Server 255, the media will be downloaded or streamed to the device from the Media Server. Third-Party media may be provided by Third-Part Media Provider 245, encoded by Media Encoder 250 and stored or cached in Media Server 255 as shown.

Figure 3:
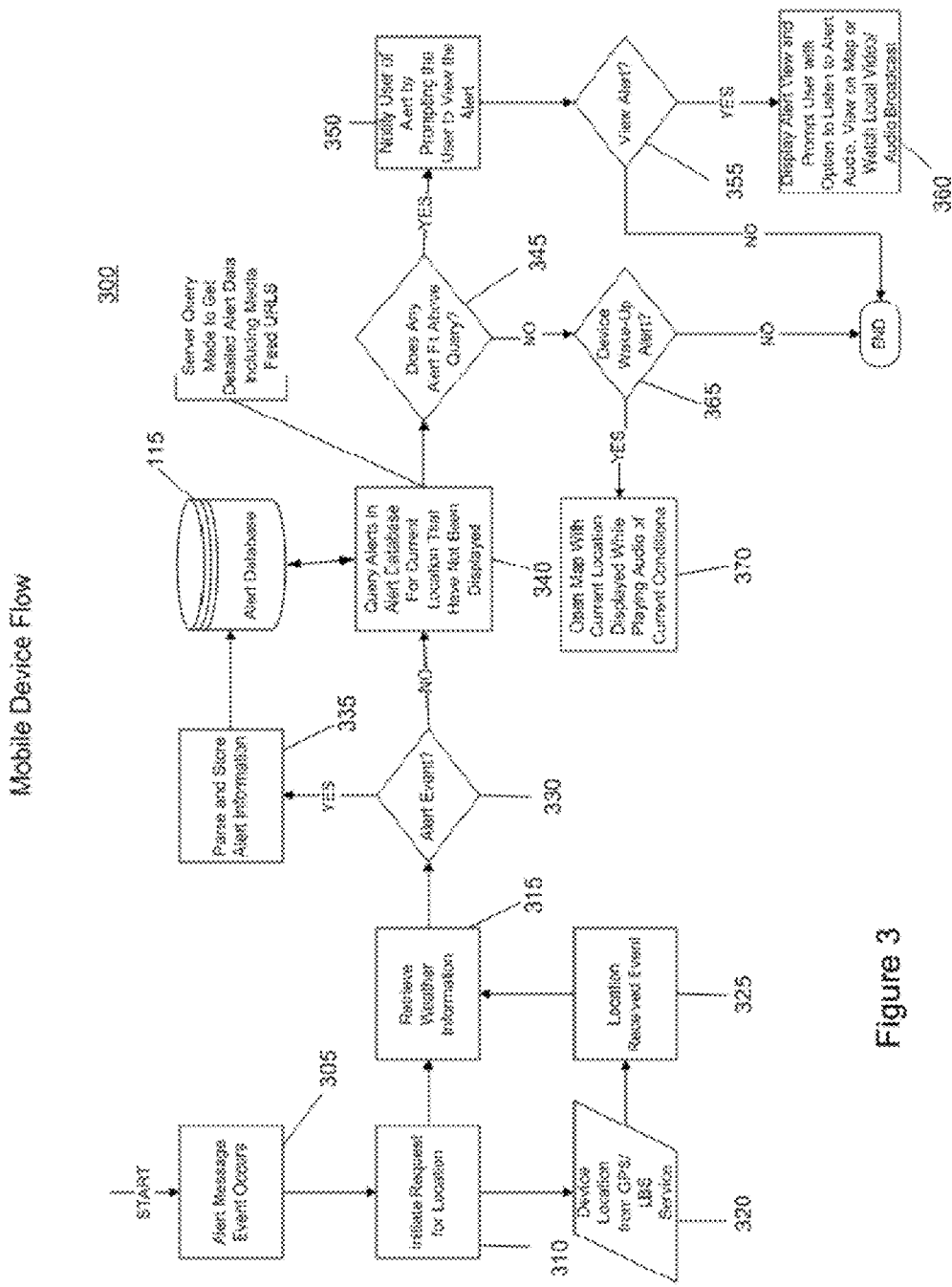
FIG. 3 is a flowchart of a mobile device flow, in accordance with various representative embodiments.

Referring now to FIG. 3, an exemplary device flow diagram 300 is shown in accordance with various embodiments. Alert delivery take places in two (2) phases: the registration phase and the alert notification phase. This section describes the registration and delivery of alert notifications to the device. There are two (2) different methods of each phase of delivering the alert to the device. These methods are separated by the device platforms that are being targeted, which may include public and third-party proprietary communication protocols and systems. For example, Apple, Inc.'s iPhone Apple Push Notification Service (APNS), Short Messaging Service (SMS), Real Simple Syndication (RSS) having text plus metadata, and Extensible Messaging and Presence Protocol (XMPP) communication protocols are just a few possible services contemplated. This does not preclude the addition of other text-based alert delivery mechanisms from being used in the future. Thus any text-message based service or system that can be sent to a mobile device as well as any event-driven message service that can be used to deliver a text-string to the mobile device is contemplated.

Referring now to Block 305, an Alert Message Event, such receipt by the device of an alert text notification message, occurs and at Block 310, the device initiates a request to determine the device location. This may be provided from a GPS or LBS service, for example, as shown at Block 320. At Block 325 the inquiry for the device is whether there is an alert or warning received for this location. Concurrently, weather information is retrieved by the device at Block 315 with input of the determined device location; retrieve information may include current weather conditions, forecast information, and alert information of the location. The current device location is converted to a tile and corresponding device tile code as previously discussed. At Decision Block 330, the inquiry is whether the event is an alert event; in other words, is the event one that rises to the level so that an alert or warning or other information is associated with it. If yes, then at Block 335, the alert information received by the phone is parsed and stored in an Alert database 115. This Alert database 115 may or may not be stored on the Device itself. If the inquiry at Decision Block 330 yielded a negative response, then at Block 340, the device queries the alerts in the Alert Database 115 for the current device location that have not yet been displayed by the Device, such as to a user of the device via a screen shot or other user interface of the device. As previously noted, a server query of a system server may be undertaken to obtained detailed alert data including Media Feeds via URLS. The database query of the Alert Dababase will identify one or more alerts stored in the alert database that have one or more alert geographical tile codes that match the device tile code representative of the current location of the device that have not been presented to a user of the device through a user interface of the device. Thus a search of all of the alert tile codes stored in the Alert Database for the device tile code will identify the alerts of interest to the device at its current location. The inquiry at Decision Block 345 is whether the query identifies any alert in the Alert Database 115 that fits the query made at Block 340. If yes, then at Block 350, the user of the device is notified of the new Alert by prompting the user to view the newly identified Alert. If the user chooses to view the alert at Decision Block 355, then the alert is displayed for viewing on the device and the user is prompted with an option to listen to audio describing the alert, to view on a map a radar view of the alert, and/or to watch a local video/audio broadcast concerning the alert.

Referring back to Decision Block 245, if no alert in the Alert Database 115 is found that fits the query at Block 340, then there is the option at Decision Block 365 of waking the device to listen to current location conditions while playing to the user an audio describing the current conditions associated with the current location of the phone at Block 370.

Registration Process

The goal of the registration phase discussed above is to notify the alert network that a device is available to be tracked and/or to receive alert messages. In this process, the device location and identification are collected and stored in the Device Location Database 150. Once the device location is collected, the system will then assign the device to a geographical region representing the location of the device called a Tile (described above), to create a virtual world grid having a sequence of 13 characters in length, where each square on the grid would represent approximately 2 miles square. As a result, this would make it easier for computing systems to maintain reasonable accuracy for the data while maintaining an efficient, easily searchable cache for alert data of interest, such as weather data.

Figure 4:
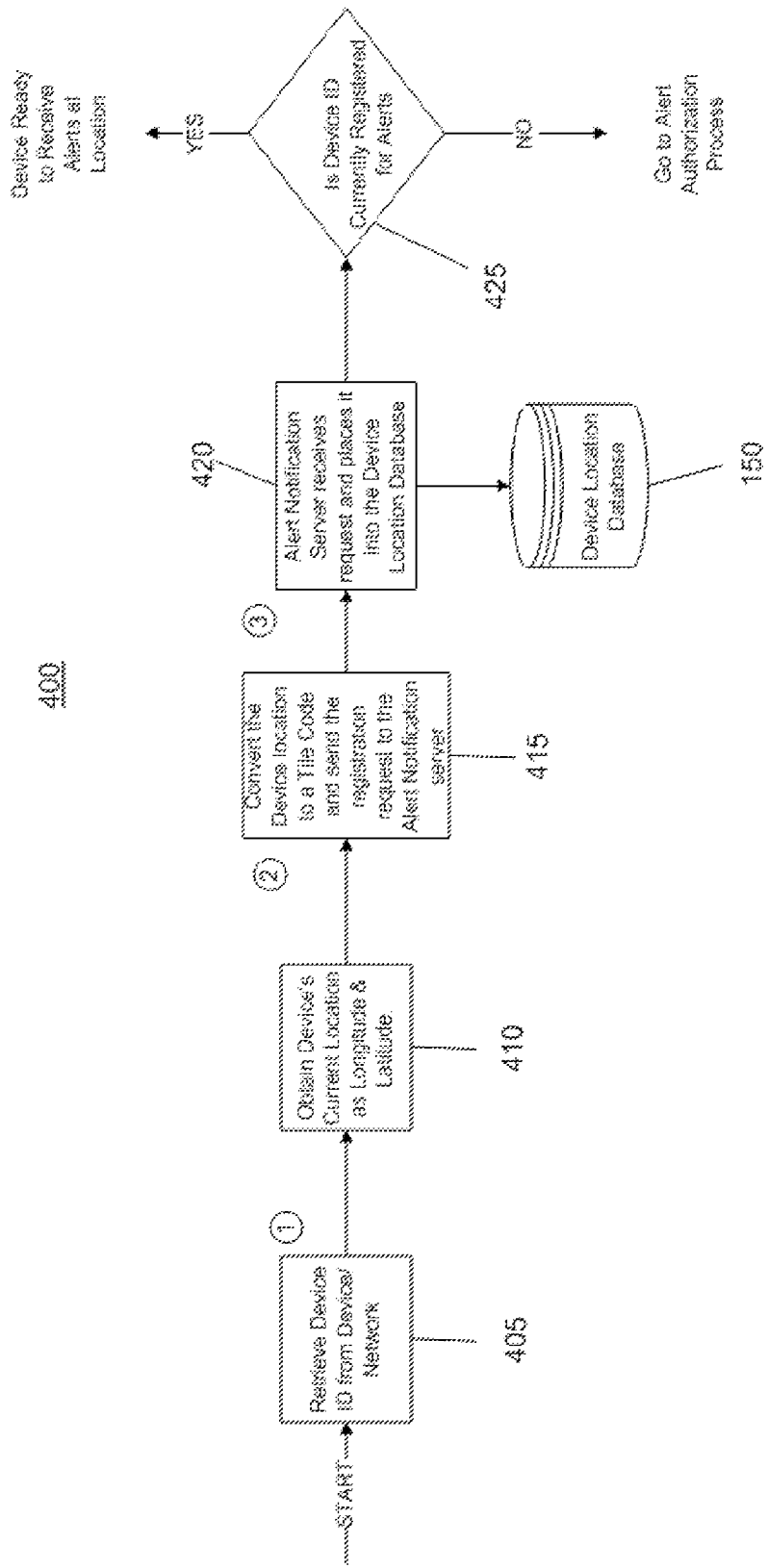
FIG. 4 is a flowchart of a registration flow, in accordance with various representative embodiments.

Referring now to flow diagram 400 FIG. 4, an exemplary registration process in which tile code information is used is illustrated in accordance with various embodiments. Note that the encircled numerals 1-3 in FIG. 4 correspond to the flow numerals below:
1. At Block 405, a Device ID is retrieved from the device or network to which the device is connected. The device ID, for example, may be embedded in the header of a transmission for some networks. The device ID may be an alphanumeric representation of the device on the network or a phone number associated with the device, in the case of a mobile phone, such as is useful in Short Message Service (SMS) messaging, for example.
2. At Block 410, the current location of a device is obtained. This may be obtained, for example, from cell-based Location Based Services (LBS) or GPS Satellite systems. At Block 415, the current device location is converted to a Tile Code and the registration request is sent to the system server. As previously discussed, this may involve converting the latitude and longitude coordinates of the device's location to a "Tile Code" used when sending the location of the device to the server.
3. The registration request is processed at the Alert Service Provider server by doing the following:
   a. Send the retrieved Device ID, the target device identifier, current Tile Code, and to the Alert Notification Server 120. The Alert Notification Server 120 receives the request at Block 420.
   b. The Notification Server 120 updates the Device Location Database 150 at Block 420 with the received Tile Code and device identifier of the device.
   c. At Decision Block 25, the Device ID is used to determine if the target device is currently registered to receive alerts. A second table may associate target devices to requesting devices along with an Active Flag. In this embodiment, this table is queried to determine where the target device and requesting device ID match the given target device ID. The goal is to see if this device ID has been registered to receive notification; a notification needs to be sent to an alarm application to authorize the requesting device to receive alerts for the targets location. If successful, store the Device ID for future reference in the Alerting Process.
   d. Query the table above for a row where the target device and requesting device IDs matches the web service request. If it does, then update the Device ID on this row. If the Active Flag is false, then start the Registration Authentication Process.

Registration Authorization/Alert Authorization

The goal of the registration authentication is to protect the privacy of device user(s) from someone requesting information about alerts at their device locations, thereby making it possible for unwanted information about the users' location to be accidentally revealed.

Figure 5:
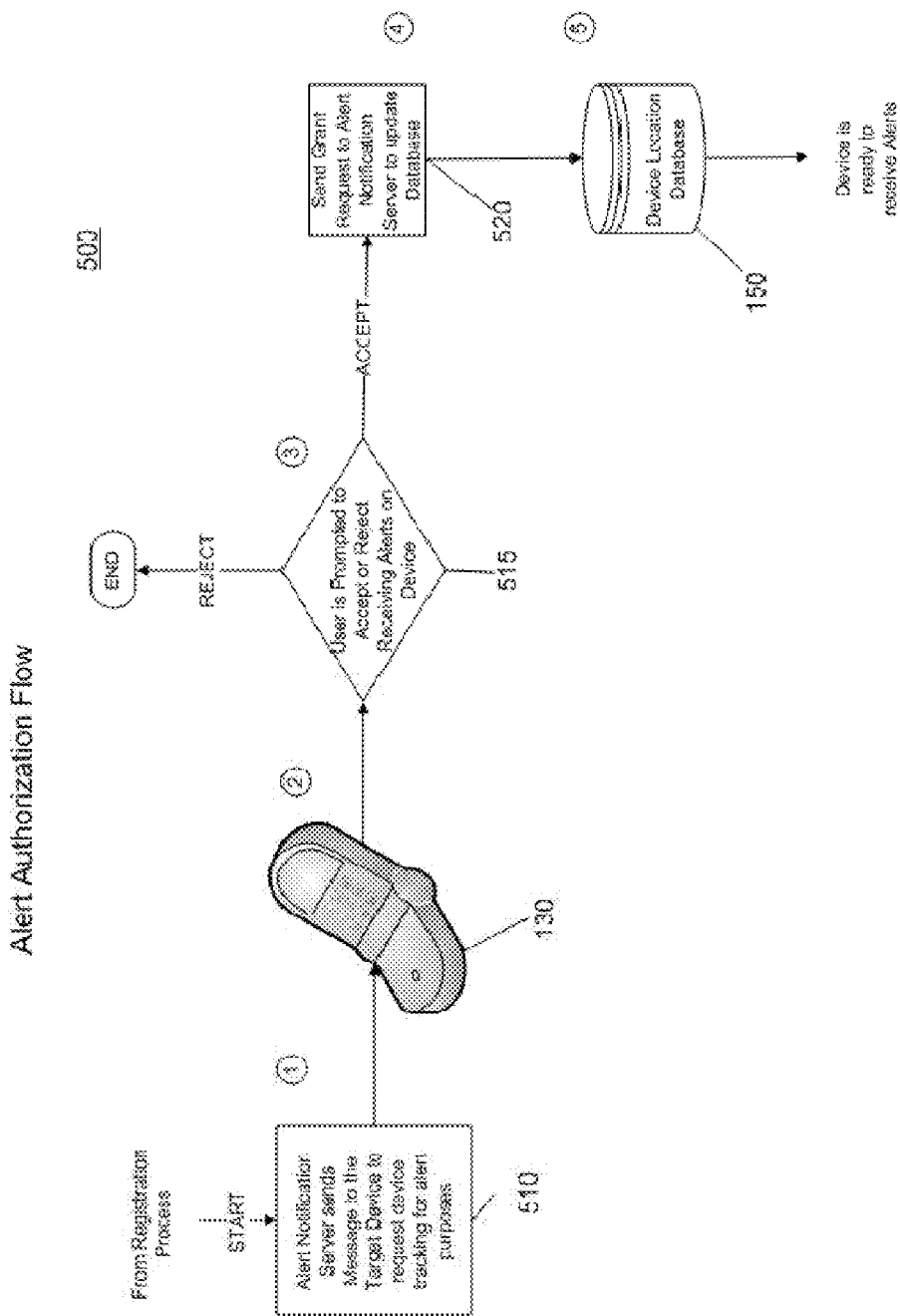
FIG. 5 is flowchart of an alert authorization flow, in accordance with various representative embodiments.

An exemplary Alert Authorization Process 500 is illustrated in the flow diagram of FIG. 5, in which an exemplary device is a mobile phone. Note that the encircled numerals 1-5 in FIG. 5 correspond to the flow numerals below:
1. Construct an authorization request text message to send to the user. This may involve the Alert Notification Server sending a notification message to the target device to request device tracking for alerts, as shown at Block 510.
2. The Notification server sends the message to the target device 130, in this exemplary embodiment the target device is shown as a mobile phone for illustration purposes.
3. The phone 130 receives the notification, prompting the user to either accept or reject the request for requesting phone number to receive emergency alerts based on their location. Thus, at Decision Block 515 the user is prompted to accept or reject receiving alerts on the device.
4. If the user grants the request and accepts to receive alerts, then at Block 520 the application will send the grant request to the Alert Notification Server 120 via SMS response, push notification response, web service, or other appropriate communications medium.
5. The Device Location Database 150 is updated to make the association between the two devices active. This process may be used for any number of target devices. The device is now ready to receive alerts.

Receiving an Alert

The Alert Notification phase is the process that enables a device such as a mobile phone to actually receive an emergency alert from the Alert Service Provider 105. The Alert Service Provider may be a Weather Alert Service Provider as was previously discussed.

Figure 6:
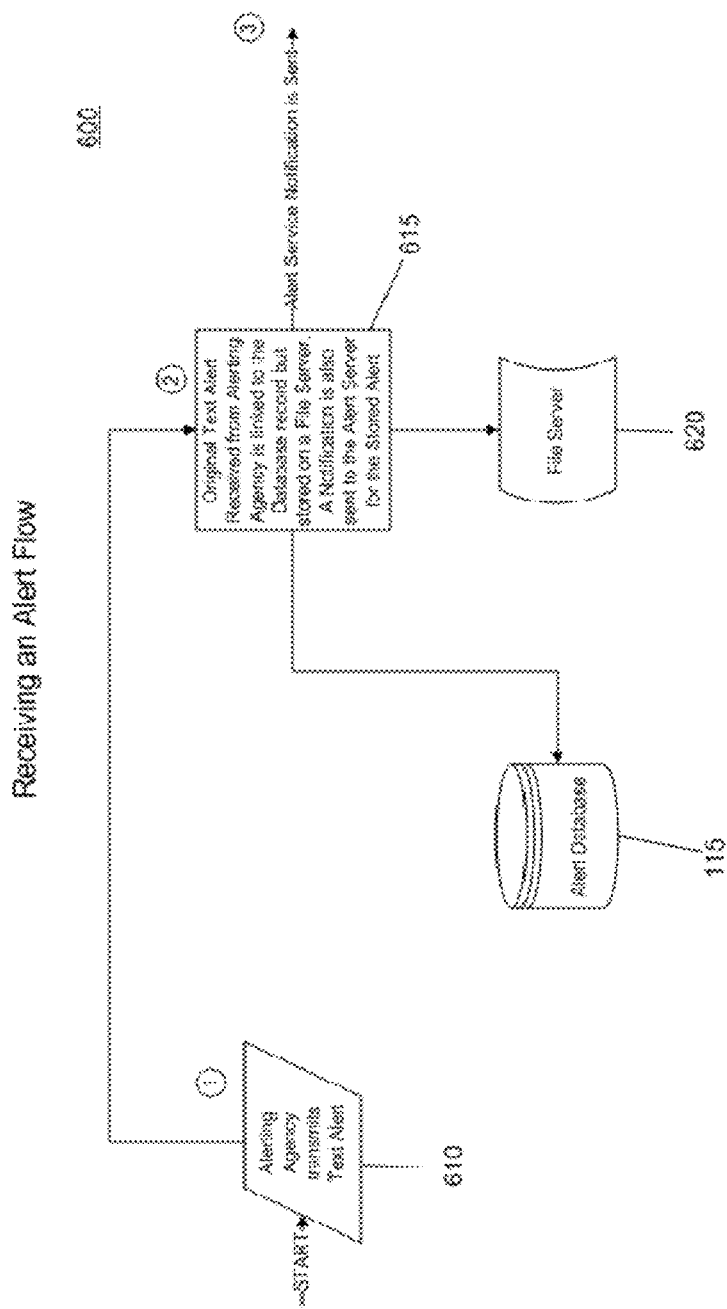
FIG. 6 is a flowchart of receiving an alert flow, in accordance with various representative embodiments.

This process begins when the Alert Service Provider 105 receives an emergency alert from an alerting source or system, which can be, by way of example and not limitation, The National Weather Service, US Geological Survey, US Department of Justice, Center for Disease Control, Lightning Decision server, Traffic Network, et cetera. Referring now to flow diagram 600 of FIG. 6, the process by which an alert is delivered and processed by the Alert Service Provider will be further described. Note that the encircled numerals 1-3 in FIG. 6 correspond to the flow numerals below:
1. At Block 610 the alerting source, shown here as an Alerting Agency 205, transmits an alert in the form of text to the Alert Service Provider 105. The Alerting Agency could also be a Weather Alert Service Provider, which is true in the case where analysis is able to predict a weather condition, such as lightning or other predictable weather condition, and then sent out an alert of the likelihood of such a predicted weather condition.
2. At Block 615 the original text alert received from the Alerting Agency 205 is linked to the database record and stored on a File Server 620. The Alert Processor or Alert Processing server 110 takes the Alert and extracts vital data (time of issue, duration of the alert, location effected by the alert, direction of a weather condition or threat, heading of a weather condition or threat, velocity of a weather condition or threat, severity of a weather condition or threat, estimated time of arrival (ETA) of a weather condition or threat such as lightning, estimated time of departure (ETD) of a weather condition or threat such as lightning, title of alert, and base text of the full alert. The extracted data is stored in the Alert Database 115 and the original file is linked to the database record and kept on the File Server 620. This allows the data to be pulled later and parsed as needed for additional alert information that may be newly relevant, given the changed location of the device. It is noted that alert data, such as duration, severity, ETA/ETD, of a weather condition etc. may be provided by a source other than the Alerting Agency 205, such as another software application running on the device, the Alert Service provider, etc.

3. A notification of the stored alert is sent to the Alert Notification Server, which generates the alert requests sent to the end user/device.

Alert Notification

Figure 7:
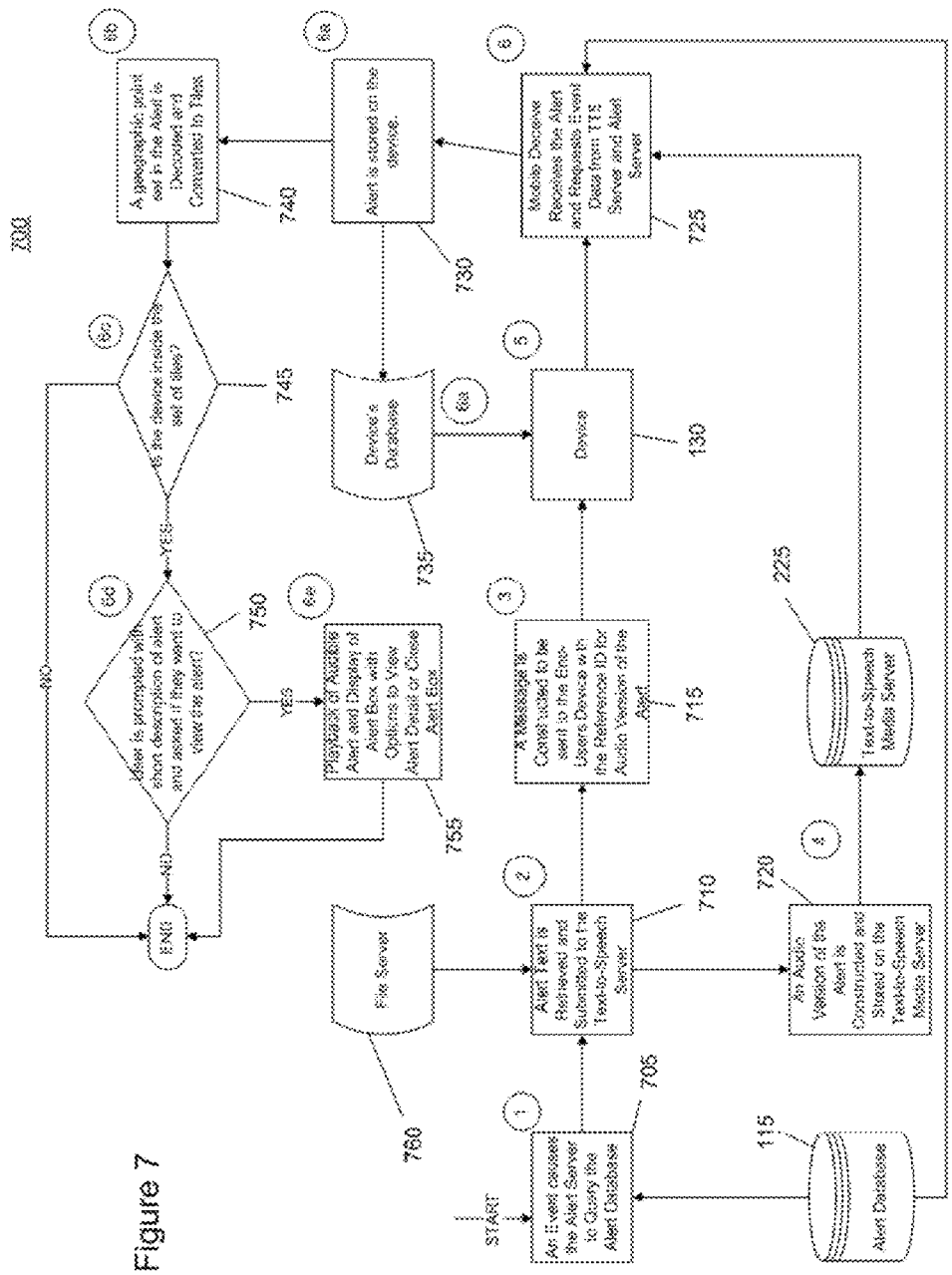
FIG. 7 is a flowchart of an alert notification flow, in accordance with various representative embodiments.

The Alert Notification phase enables a device to actually receive notification of an alert available to be retrieved from the Alert Service Provider 105. Referring now to FIG. 7, an exemplary alert notification process flow 700 of how the alert is sent to a device from the alert server is illustrated. Note that the encircled numerals 1-5 and 6a, 6b, 6c, 6d and 6e in FIG. 7 correspond to the flow numerals below:

1. At Block 705 an event causes the Alert Server to query the Alert database 115 for alerts. This query action may also be done automatically and periodically.
   a. The Alert information is retrieved from the Alert Database 115.
   b. The Location of the Alert is converted to one or more affected tiles, which may be referred to as a collection or plurality of tiles, which is then compared to the one or more tiles of interest of the Target Devices and static locations in the Target device database. The Target Devices can be both devices that are cross-referenced, using tile codes, in the Device Location Tables or static locations. The result of the comparison will yield only the registered device(s) that contain Target device entries that match the location of the alert. The resulting device or devices of this query will be the destination devices when sending the alert messages.
2. The alert text is retrieved and submitted to a Text-to-Speech Server or Module at Block 710.
3. A Message is constructed to be transmitted to the user of the device that includes a referencing identifier that allows the device to query for additional event information including the URL of the file containing the audio version of the alert at Block 715.
4. Moreover, at Block 720 an audio version of the alert is constructed and stored. For example, the audio file is received from the Text-to-Speech Server/Module and stored on the Text-to-Speech Media Server 225.
5. The alert message is sent to the device 130.
6. Next, at Block 725 the mobile device receives the alert and requests additional event data from the TTS Media Server 225 and Alert Database Server 115. This request for additional event data may be in response to user input received at a user interface of the mobile device. Once the event data is received, then the following process is followed:
   a. The alert is stored on the device at Block 730. As shown, this may be a database on the device as shown in Block 735.
   b. A geographic point set in the Alert is Decoded and converted to a set of tiles with corresponding set of tile codes at 740.
   c. The inquiry at Decision Block 745 is whether the device is inside the identified set of tiles determined at Block 740. If the device is inside the alert set of tiles, then proceed with displaying the alert if the user agrees.
   d. At Decision Block 750, The user is prompted with an abbreviated version of the alert and asked if they wish to view the full alert at Decision Block 750. If not, then processing the alert stops.
   e. If the user wishes to view the full alert, then at Block 755, playback of the audio alert and display of the alert box or panel with options to view the alert in detail occurs. The alert box may also be closed. Thus, in the alert box in which alert text is displayed to the user, buttons may be displayed allowing the user to view more information about the alert or to simply close the alert box. The user may therefore be notified using a combination of the audio alert information being played back to the user along with an alert box containing the alert text displayed to the user.

Retrieve Alert Media

One requirement of the Multimedia Alert System may be to link broadcasts of both audio and video supplied by third-party broadcasters to severe weather events. Too support this, each third-party broadcaster is required to record video and/or audio clips in formats such as Apple, Inc.'s iPhone or Google's Android platforms, or other platforms of interest can render and store an entry in a Media RSS file sorted according to time in descending order.

Thus, each entry in the Media RSS file may contain at least the following information: a thumbnail representing a first frame of video or the media clip; a brief description of the media clip; and a URL needed to retrieve the media clip.

Figure 8:
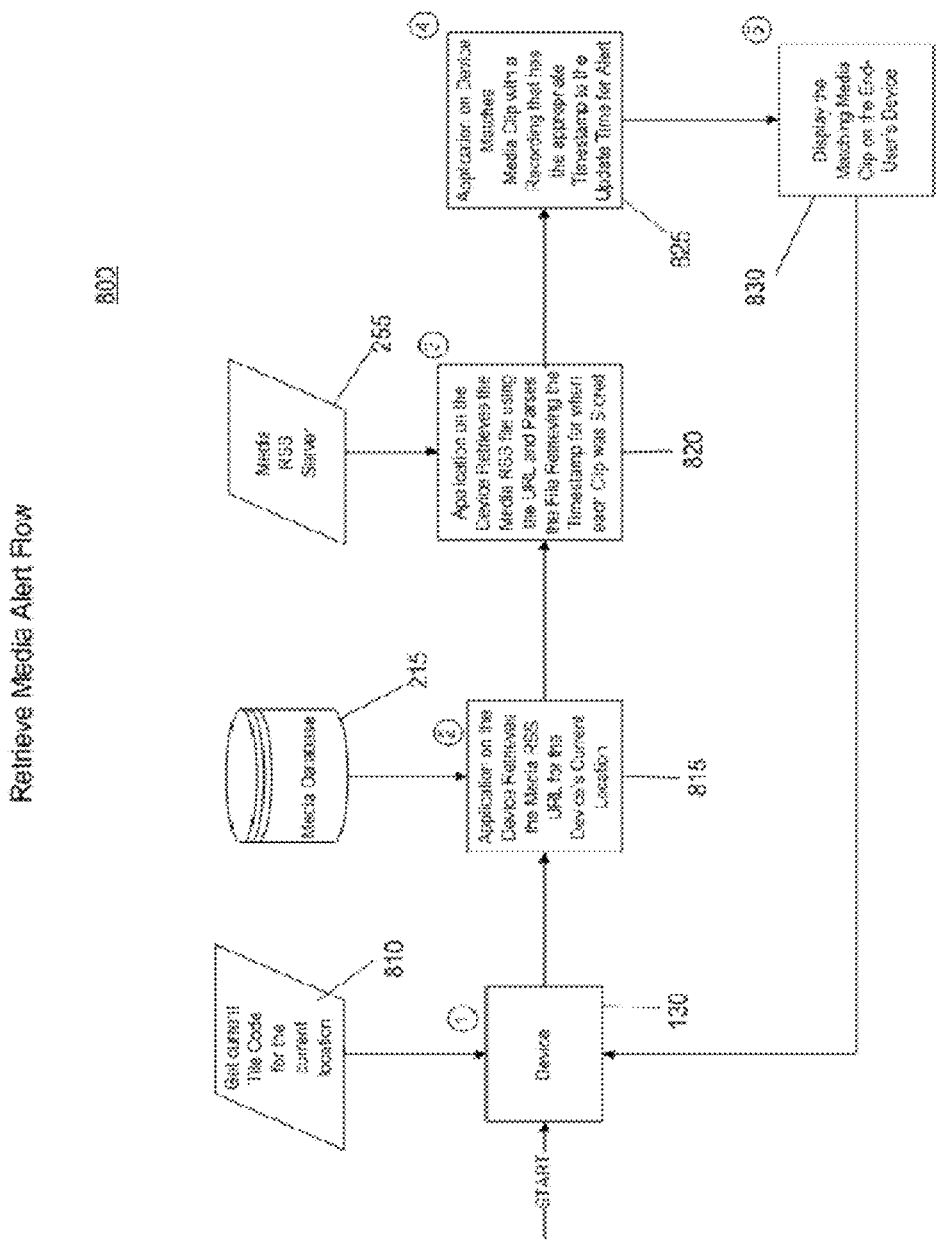
FIG. 8 is a flowchart of retrieving a media alert flow, in accordance with various representative embodiments.

Referring now to flow diagram 800 of FIG. 8, a retrieve media alert flow in accordance with various embodiments is disclosed. Note that the encircled numerals 1-5 in FIG. 8 correspond to the flow numerals below. Thus, when the user selects to view the local video about the alert, the following occurs in connection with certain embodiments:

1. The Device 130 obtains the current Tile Code for the devices' current location Block 810.
2. The application on the device retrieves the Media RSS URL for the current Tile from the Media Server Database 215 at Block 815.
3. The application on the device retrieves the Media RSS file from the Media RSS Server 255 using the URL and parses the file retrieving the title, time and location of each clip stored.
4. At Block 825, the application on the device matches the media clip with a recording that has the appropriate timestamp to the update time for the alert. Thus, the recording matches the following criteria: 1) the recording time is within 15 minutes of the update time of the alert; and 2) it is the closest time match to the alert.
5. The Mobile device then retrieves the actual media from the Media Server and then renders it on the Mobile device at Block 830.

Data Storage

Data for use in accordance with various embodiments of the Multimedia Alert Method, System, Apparatus and Device may be organized into two (2) databases: the Alert Database 115 and the Device Location Database 150. The data sets in each database may be as follows:

| Alert Database | Device Database |
| --- | --- |
| Alert Table: | Device Location Database Table: |
| Alert ID: auto number (key) | |
| Full Text of NWS alert - NWS Alert | Device Identifier |
| | APN Device ID (Used with iPhone Only): string |
| Title of NWS alert - NWS Header | Tile Code: string |
| | Media Database Table: |
| Text Body of NWS alert - NWS Alert Text (between headers and '&&') | id: auto number |
| | Tile Code: string |
| Event Identifier of the alert - VTEC Header | Media Metadata URL: string |
| | Target Device Database Table: |
| Sequence number representing revision/update number of alert - Auto Generated | id: auto number |
| | Registered Device Identifier: string |
| Issue Time of the Alert - VTEC | Target Device Identifier: string |

| Alert Database | Device Database |
|---|---|
| Last Update Time of the Alert - NWS Header<br>Expiration Time of the Alert - VTEC<br>County Code of the Alert - NWS Location Header<br>Phenomena Type - VTEC<br>Significance Flag - VTEC<br>Lat/Long Text Field -<br>LAT . . . LON statement<br>Alert Location Table:<br>ID: auto number key<br>Alert ID: foreign key (number)<br>Tile Code: string (key with duplicates) | UGC Code Table:<br>id: auto number<br>NWS UGC County Code: string<br>Tile Code: string |

Battery Management

Based on battery status of a Device, a device application may alert the user to one or more features of the application that will consume significant amount of power thus allowing the user to prolong battery life in critical situations. For example, such low battery alerts may notify the user when they:

a. Select to view video on the device: an audio only broadcast option would be available.

b. The device would automatically reduce the "Update Rate" of the devices location to report location at a slower rate thus reducing the number of times a radio transmission is necessary.

c. In addition to reducing the device location "Update Rate", the accuracy of the update request also changes linearly from 10 meters using GPS to 3 kilometer accuracy using cell tower triangulation as the battery discharges. The accuracy of the requested location information will vary linearly from 10 meters at 100% battery capacity to 3,000 meters (3 km) at 40% of battery capacity remaining. For instance, when the battery is at full charge the requested location accuracy will be 10 meters from GPS satellite, at 80% charge left the device will request an accuracy of 1,000 meters (1 km), at 60% charge left the device will request an accuracy of 2,000 meter accuracy and switch to Cell Tower triangulation, and then at 40% of battery capacity left the accuracy would become 3,000 meter (3 km).

Figure 9:
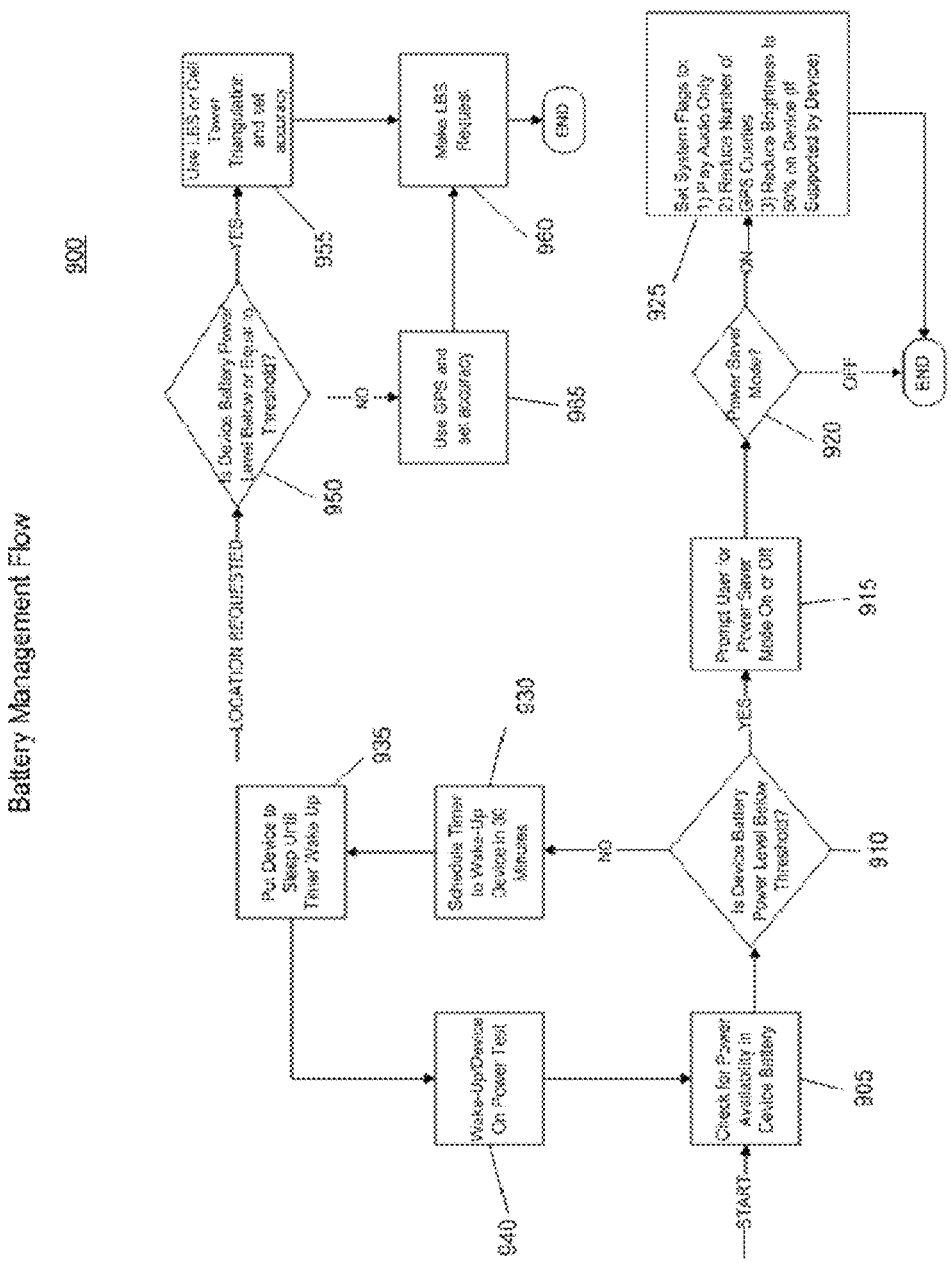
FIG. 9 is a flowchart of a battery management flow, in accordance with various representative embodiments.

An exemplary Battery Management flow diagram 900 is illustrated in FIG. 9. At Block 905, a check for power availability in the device battery is undertaken. If at Decision Block 910 it is determined that the Device battery power level is less than some threshold, such as less than 40%, for example, then at Block 915, the user is prompted to activate a power saver mode of the Device. At Decision Block 920, if the user chooses to enter/activate the Device's power saver mode, then at Block 925 various system flags may be set to activate the power saver mode. As shown, some examples of power saver mode actions may be to play audio only, reduce the number of GPS queries undertaken, reduce the brightness of the Device screen to some level, such as 50%, for example, if supported by the Device.

If the current battery power level of the Device is not below the threshold, then the flow continues to Block 930 to schedule a timer to wake-up the Device, such as in 30 minutes. The device is then put into its sleep mode at Block 935 until the timer wakes it up. The Device wakes-up at Block 940; this may occur by operation of the timer or upon power-up of the Device.

Power conservation of the Device may be triggered upon a request of the location of the Device. At Decision Block 950, the inquiry after a location request might be whether the device battery power level is less than or equal to a threshold, such as 60%. If yes, than at Block 955, LBS or cell tower triangulation may be used to lower the accuracy obtained in the location determination. The LBS request is made at Block 960. Again, this level of decreased accuracy may be perfectly acceptable within lesser degree of accuracy needed for the Tile Code regime. If this is not acceptable, than at Block 965, GPS is used and the accuracy achievable with GPS location determination may be set.

Lightning Alerts

In accordance with various embodiments, the lightning alert is generated based on the probability that lightning will strike a given location based on data. These alerts are delivered to the alert system from system servers at an Alert Service Provider and other lightning networks.

How Lightning Alerts are triggered

Lightning information is gathered by lightning detectors from third-party networks and that information is supplied to the Alert Service Provider for analysis. The information supplied from the lightning networks given the approximation of the location of lightning strikes in longitude and latitude coordinates along with the time that the strike was recorded. The lightning alert is triggered based upon the frequency or strikes within a given time period at a given location.

Figure 10:
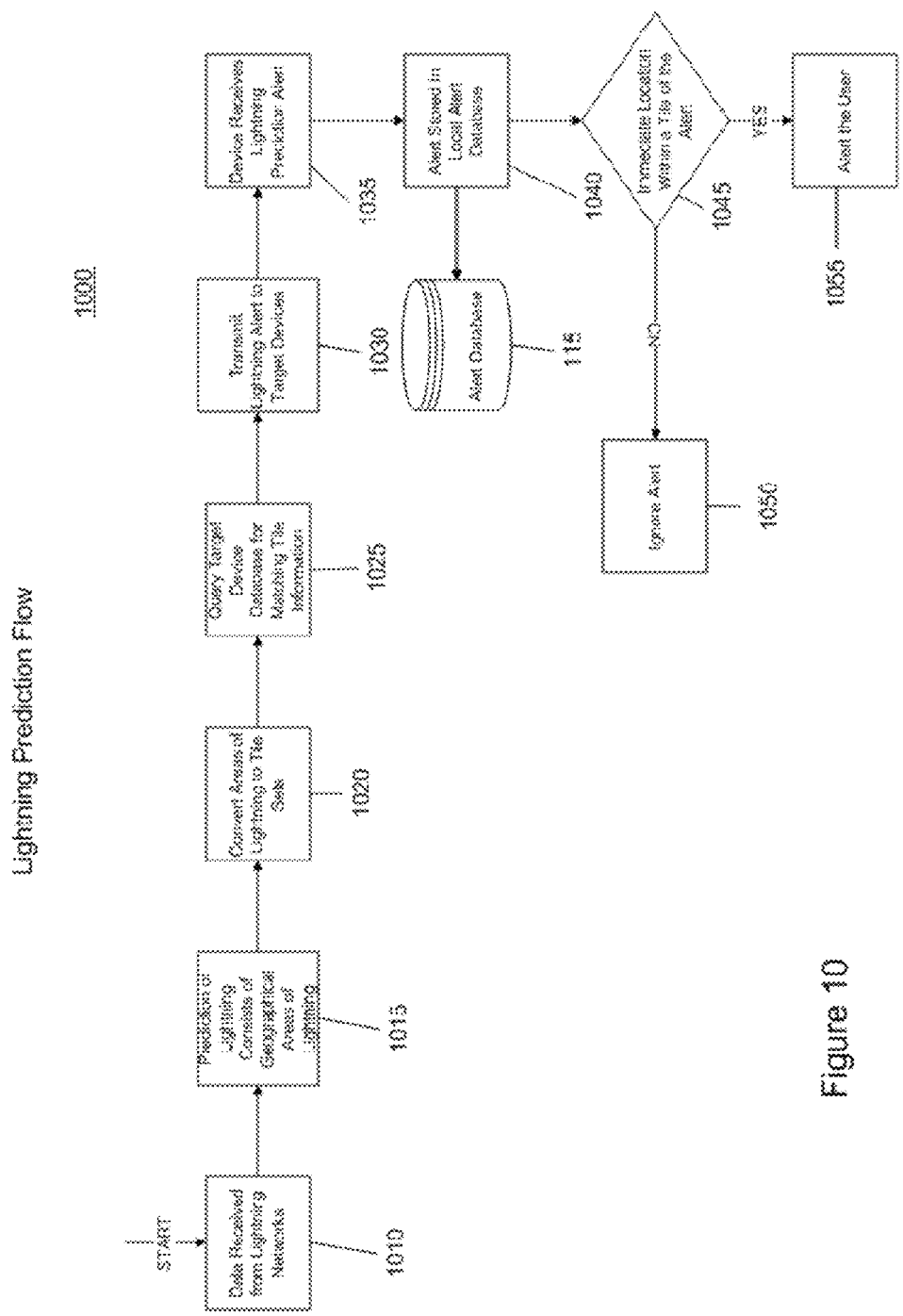
FIG. 10 is a flowchart of a lightning prediction flow, in accordance with various representative embodiments.

An exemplary lighting prediction flow diagram 1000 is illustrated in FIG. 10. At Block 1010, data is received from lightning networks, source networks for lightning information. At Block 1015, a prediction of lightning activity or events, such as lighting strikes, consisting of geographical areas of lightning activity, is undertaken. The geographical areas of the lightning activity is converted to Tile Sets and corresponding Tile Code information at Block 1020. At Block 1025, the Device Location Database 150 is queries for matching Tile information. At Block 1030, one or more lightning prediction alerts may be transmitted to target Devices having matching Tile information. The Device receives the lightning prediction alert at Block 1035. The Alert may be stored in the local Alert Database 115 at Block 1040. At Decision Block 1045, the inquiry is whether the immediate or current Device location falls within a tile of the lightning prediction alert. If so, then the user of the Device is alerted at Block 1055. If not, than the lightning prediction alert is ignored at Block 1050.

Figure 25:
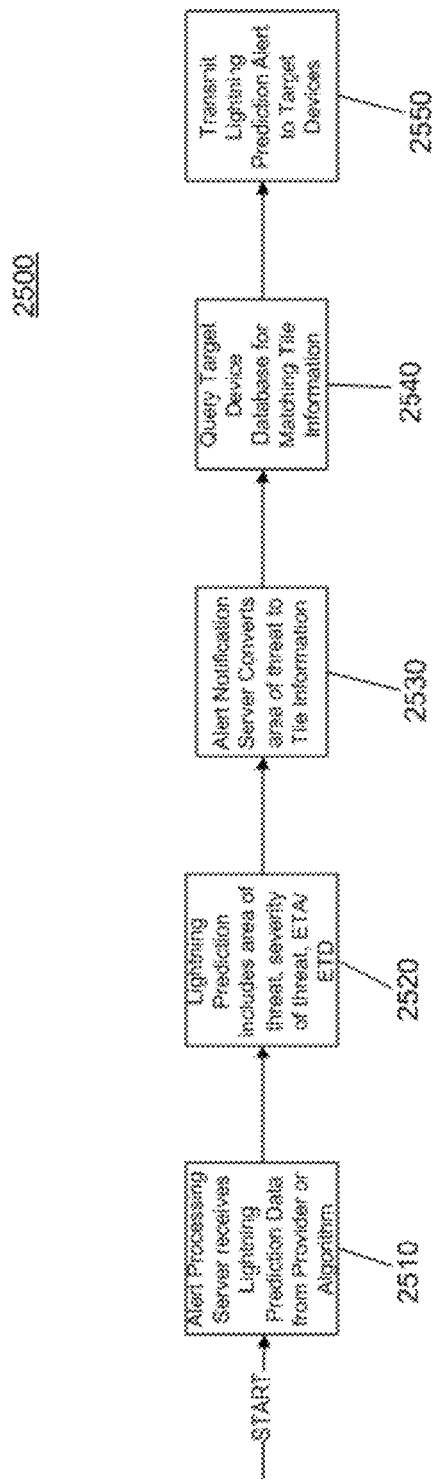
FIG. 25 is a flowchart of a lightning prediction flow, in accordance with various representative embodiments.

Referring now to FIG. 25, a flowchart of a lightning prediction flow 2500, in accordance with other various representative embodiments, is shown. At Block 2510, the Alert Processing Server receives lightning prediction data from an alert provider or algorithm and that lightning prediction data is used to define the lightning prediction. At Block 2520, the lightning prediction includes valuable information, such as area of lightning threat, severity of lightning threat, and the ETA/ETD of the lighting threat. At Block 2530, the Alert Notification Server converts the area of threat to tile code information, as previously discussed. At Block 2540, the target device database is queried for matching tile information. The lightning prediction alert is transmitted to one or more target devices at Block 2550.

Figure 26:
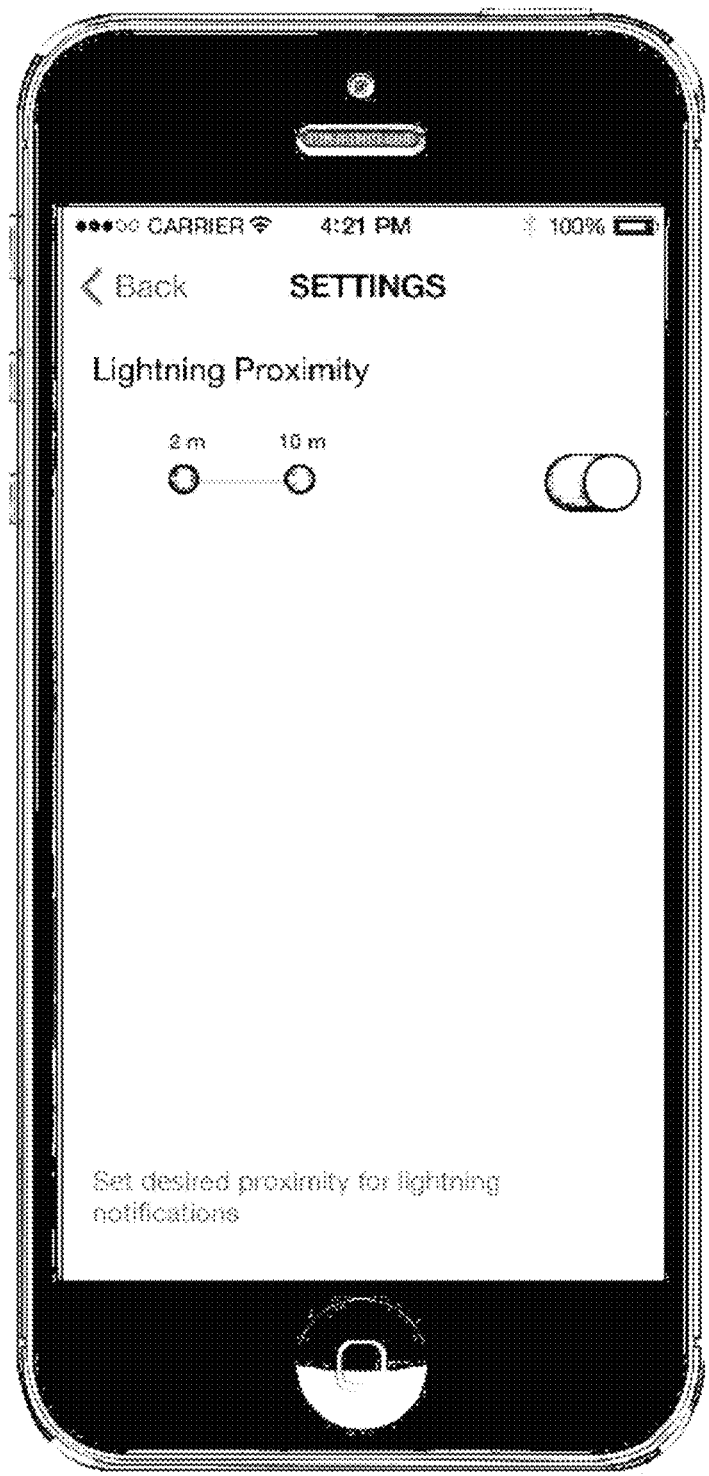
FIGS. 26-27 are screenshots of various user interfaces of an alerting application, in accordance with various representative embodiments.

As lighting is an event that occurs at a given location (the lightning strike) and within a given time or range of time, it is a discrete condition for which it is possible to know the distance of the strike location to a specified geographical tile and whether one or more alert geographical tiles associated with the discrete condition are within a user defined distance from the location of the discrete condition. The distance from the strike location radiates out in all directions to define a circle having its center at the strike location in an alert geographical tile at the center of the one or more alert geographical tiles that represent the alert region and the body of the circle defined by one or more additional alert geographical tiles radiating out from the strike location. All of these alert geographical tiles represent the point-based, circular alert region. This distance may be set by a user of the Device, i.e. user-defined, as shown in FIG. 26. As shown in the drawing, through interaction with the user interface of a touch screen mobile device, for example, the user may set the desired proximity for lightning notifications to be provided to the user via the Device. In the particular example shown, the user is given the choice of setting the lightning proximity to either 2 miles or 10 miles from either the current location of the device or from a location other than the current location of the device. The user-defined distance, then, may be a distance from the lightning strike to the location of the user with his Device, or it may be a distance from the lightning strike to another location, a non-changing location specified by the user that is monitored. For example, the user may wish to know when lightning strikes occur within 2 miles of his child's school or within 10 miles of home, both of which are examples of non-changing locations other than the location of the Device.

Figure 27:
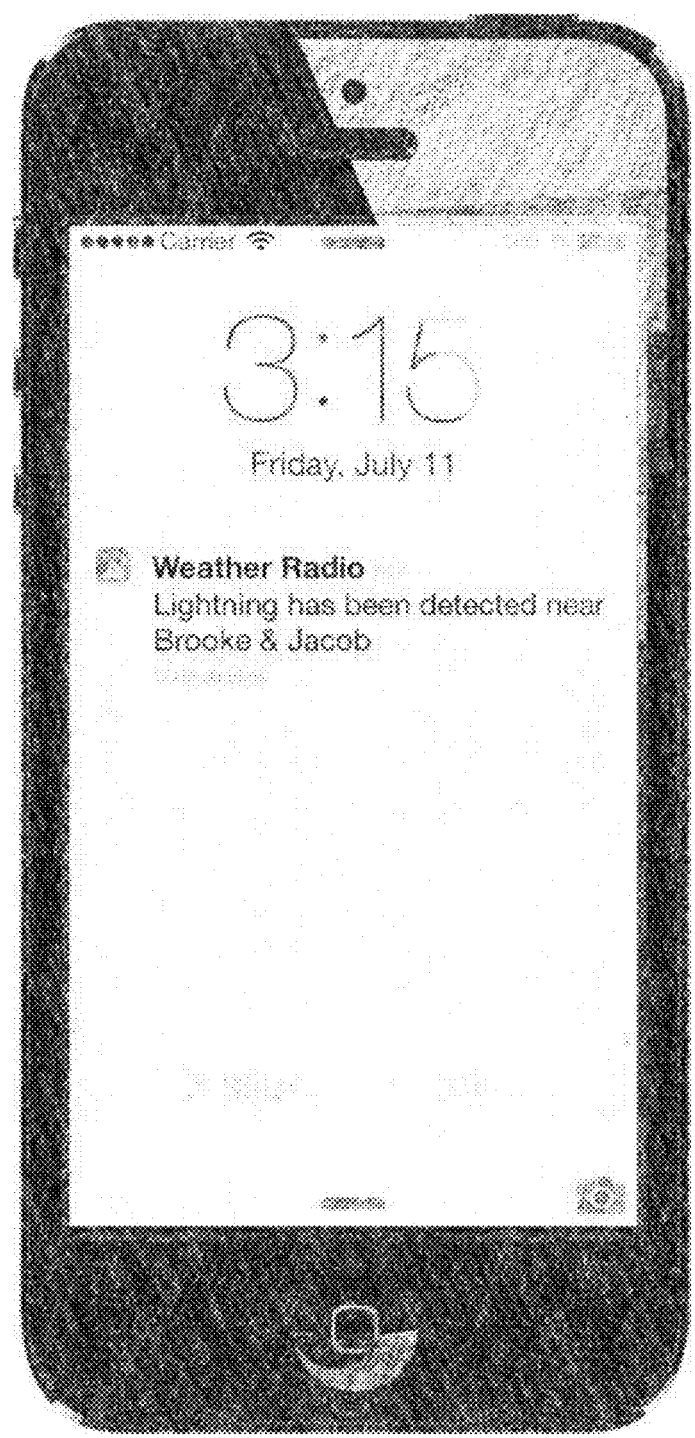

FIG. 27 shows an example of a lightning detection event communicated to the user via a user interface of the Device, in this case, a touch screen mobile device.

In addition to a lightning strike, an epicenter of an earthquake is an example of a discrete condition for which the user may be alerted. In that case, the user may be alerted when the epicenter of the earthquake, a discrete location, is within a user-defined distance from either the Device location or a non-changing location other than the Device location. For either type of discrete condition, the alert data of the condition may include the time of issue of the alert, a duration of the alert, a severity of the alert, a title of the alert, and a base text of the alert.

As described, a method of providing alert information to a user of a location-enabled device of an alert of a discrete condition is provided. In particular, in response to receiving notification of the occurrence of an alert of a discrete condition occurring at a location, a current location of the device is determined and the determined current location is converted to a device geographical tile of a plurality of geographical tiles that encompasses the determined current location, wherein each of the plurality of geographical tiles represents a unique geographic projection of a rendered geographical area of defined size and wherein the device geographical tile is represented by a device tile code. The alert data received about the alert of the discrete condition is an alert message event is processed and the location of the discrete condition, e.g. lightning strike, is converted to an alert geographical tile and stored in an alert database that stores alerts if it is determined that the device tile code of the device geographical tile matches any of one or more alert geographical tiles that represent the one or more alert geographical tiles that define (encompass) the discrete condition and the user defined distance from the location of the discrete condition. The one or more alert geographical tiles are within a user defined distance from the location of the discrete condition and each of the one or more alert geographical tiles is represented by one or more alert tile codes, the one or more alert geographical tiles are of the plurality of geographical tiles, and the device geographical tile and each of the one or more alert geographical tiles are the defined size of the plurality of geographical tiles. Next a database query of the alert database is performed to identify one or more alerts stored in the alert database having one or more alert geographical tile codes that match the device tile code representative of the current location of the device and that have not been presented to a user of the device through a user interface of the device. The database query means searching the alert database for the device tile code. The Device user via the user interface of the device is notified of the identified one or more alerts of interest to the current location that have not been presented and the user is prompted to view the identified one or more alerts via the user interface of the device.

Further, when a location other than the current device location is to be monitored with respect to the discrete condition alert, alert data received about the alert in an alert message event in an alert database that stores a plurality of alerts is processed and stored if it is determined that a location tile code of a location geographical tile matches any of one or more alert geographical tiles that represent the one or more alert geographical tiles that define the discrete alert condition and geographical tiles that represent the user defined distance from the discrete condition; As before, each of the one or more alert geographical tiles is represented by one or more alert tile codes, the one or more alert geographical tiles are of the plurality of geographical tiles, and the location geographical tile and each of the one or more alert geographical tiles are the defined size of the plurality of geographical tiles. A database query of the alert database may be performed to identify one or more alerts stored in the alert database having one or more alert geographical tile codes that match the location tile code representative of a location other than the current location of the device and that have not been presented to a user of the device through a user interface of the device. The database query is performed by searching the alert database for the location tile code. Next, the user of the Device is notified via the user interface of the device of alerts of interest to the location other than the current location of the device that have not been presented and the user is prompted to view the identified one or more alerts via the user interface of the device.

Further, with reference to the block diagram and flows discussed above, in accordance with communicating the occurrence of a discrete condition such as lightning or an earthquake, an alert service provider transmits to an alert processing server an alert notification of an alert of a discrete condition occurring at a location. The alert notification is stored in an alert database coupled to the alert processing server. An alert notification server can retrieve the alert notification from the alert database and determine one or more alert geographical tiles of interest that are affected by the alert. Again, the one or more alert geographical tiles define (encompass) the discrete condition and the user defined distance from the location of the discrete condition. The alert notification server can further determine one or more location-enabled devices having a location that falls within an alert geographical tile, where each alert geographical tile is within a user defined distance from the location of the discrete condition. A text portion of the alert is retrieved from the alert database and the text portion of the alert processed to generate an audio version of the alert. An alert text notification of the alert is constructed having the text portion of the alert, an alert identifier of the alert, a reference identifier for the audio version of the alert, the one or more alert geographical tiles and the one or more device identifiers for each of the one or more devices and the alert text notification is stored into an alert notification queue. A gateway server can retrieve the one or more device identifiers for each of the one or more devices, the alert text notification and the alert identifier of the alert from the alert notification queue and transmit the alert text notification to the one or more devices corresponding to the retrieved one or more device identifiers. Operation of the various elements, including the alert service provider, alert notification server, and gateway server, are discussed above.

Moreover, a Device can receive and process the alert text notification and request to receive alert data of the alert. Before the Device requests the receive alert data, a current location of the device represented by a device geographical tile is obtained and the current location of the device is converted to a device tile code and the device tile code representative of the current device location stored to a device location database.

The Device receives and presents to a user of the Device the received alert data of the alert through a user interface of the device. If the Device is not authorized to receive alert notifications, the alert notification server sends to the Device a request message requesting tracking of the device for alert notifications. If the request message is approved, the alert notification server updates the device location database to include the device as a registered device.

In this manner, a method of providing alert information concerning the occurrence of a lightning strike, earthquake, or other discrete condition is provided to a user of a Device.

Device Graphical User Interface

Examples of user interfaces, with description, for a user of a device, shown as a mobile phone, are provided in the screen shots of FIGS. 12-24. The screen shots are generated, controlled and rendered to a user of the mobile phone by a weather alert application running on the mobile phone.

Figure 12:
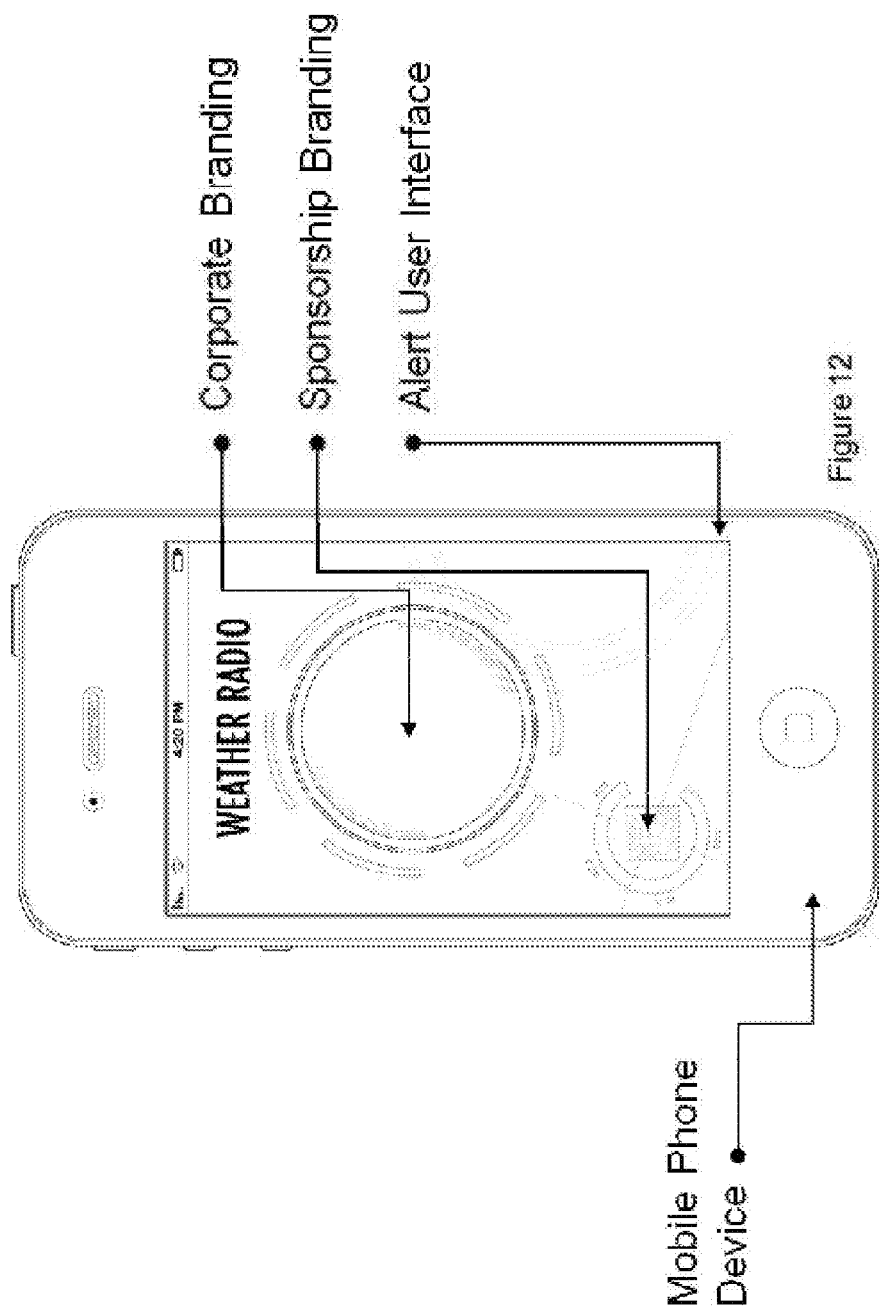
FIGS. 12-24 are screenshots of various user interfaces of an alerting application, in accordance with various representative embodiments.

Referring now to FIG. 12, an illustration of a mobile device that is under control of a weather application to operate as a weather radio to provide weather information and alerts to a user of the mobile phone via a user interface is shown. The alert application running on the mobile phone causes a splash screen to be displayed to a user of the device that may have information such as corporate branding and sponsorship branding displayed as shown. Corporate and sponsorship branding are useful in partnering with sponsors or third-party local, regional or national media providers to provide alerts. This screen may appear if the user launches the application without an alert, such as a severe weather alert waking up the phone via a pop-up screen.

Figure 13:
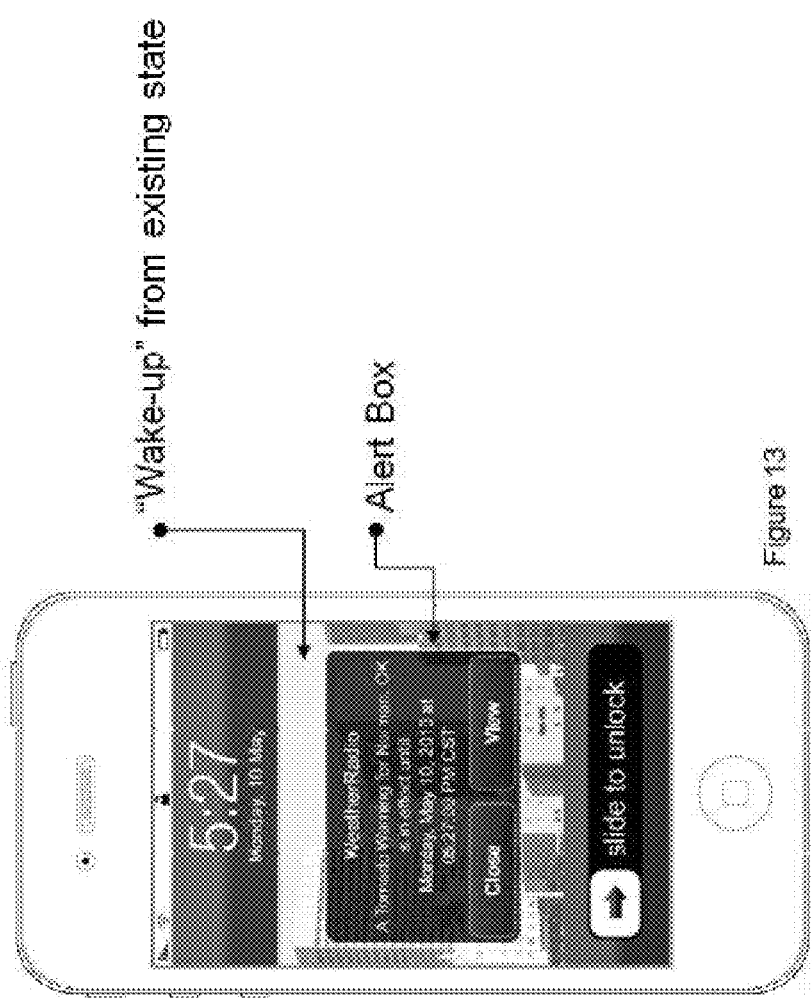

Referring now to FIG. 13, a screen shot of a mobile phone waking-up from an existing state of the phone can be seen. The existing state of the phone may be operation of another application of the phone. When on, the mobile phone wakes up when a severe weather alert is received by the phone, such as via Push Notification in the case of an iPhone. The audio portion of the alert is provided first. Upon the phone waking up for the alert, a number of auditory sounds, such as three beeps, may be sounded, followed by playing of the alert summary until the user selects "view" to view the alert on the alert detail screen, where the alert related to this pop-up will be highlighted, or until the user selects to "close" the alert. Only the summary of the alert is played in this pop-up until the user selects to learn more about the alert. In this particular example, the following alert summary is read or played audibly for the user of the device:

"A Tornado Warning for Norman, Okla. is in effect until Monday, May 10, 2010 at 05:27:00 PM CST."
The main device volume may be lowered (if not silent) and the alert audio volume increased so that the alert summary will be more readily heard. The background for the alert box or panel may be semi-transparent as shown. If desired, a background color for the alert box may be chosen, such as red.

Figure 14:
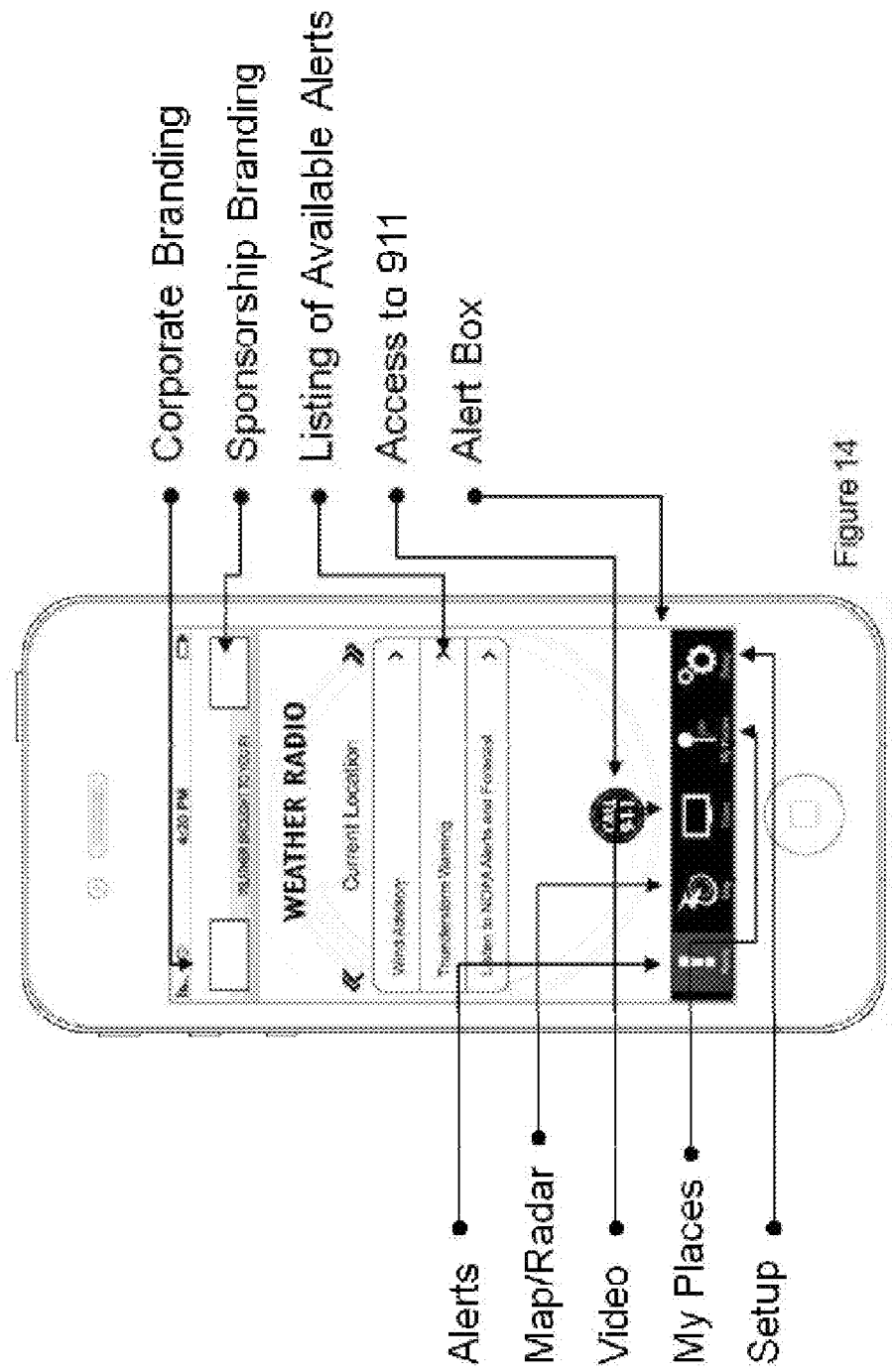

Referring now to FIG. 14, a weather alert list screen that lists alerts that are available for viewing is illustrated. A user has navigated to this screen by selecting the View button on a pop-up alert and the related alert will be highlighted in the listing of alerts. In this drawing, the alert box provides important alert information to the phone user. In the alert box, five menu control buttons are displayed along the bottom of the alert box, from left to right: an Alert Button, a Map/Radar button, a Media (video) button, a My Places button, and a Setup button. The Alert Button when selected allows a viewer to see a listing of available alerts for the current location, as shown in this drawing. The Map/Radar button can be selected to show radar and map information for an alert area. The Video button can be selected to see/hear live streaming video and/or audio about a selected alert if available. The My Places button at the bottom of the alert box allows a user to select and control locations of interest. The Setup button allows the user to select settings for the alert application, such as weather settings, as will be described.

It can be seen that the Alert Button is selected and the weather alert list screen lists three alerts for the current device location: a wind advisory, a thunderstorm warning, and forecasts for the location. Any of these three alert notifications can be selected to access more detailed information. It can be seen that although the alerts are listed for the current location, the forward- and backward-arrows indicate that the user can scroll through other locations if desired. The My Places button at the bottom of the alert box allows a user to select and control locations of interest. The user can additionally scroll down the list in the alert panel to see additional alerts.

Also as part of the alert box, the user can access local emergency services by activating the 911 alert button. The user can select the 911 button to launch a standard emergency dialer with the needed 911 number pre-filled. The user would then have to only select the (green) call button to activate a call to emergency services. In some instances, the 911 button may only appear if there is an alert for the device's current location; otherwise, a "call contacts" button may be provided, as illustrated in another drawing.

Corporate branding is shown and a user may select corporate branding if they wish to visit a corporate website, by launching their browser. Sponsorship branding may also be shown.

Figure 15:
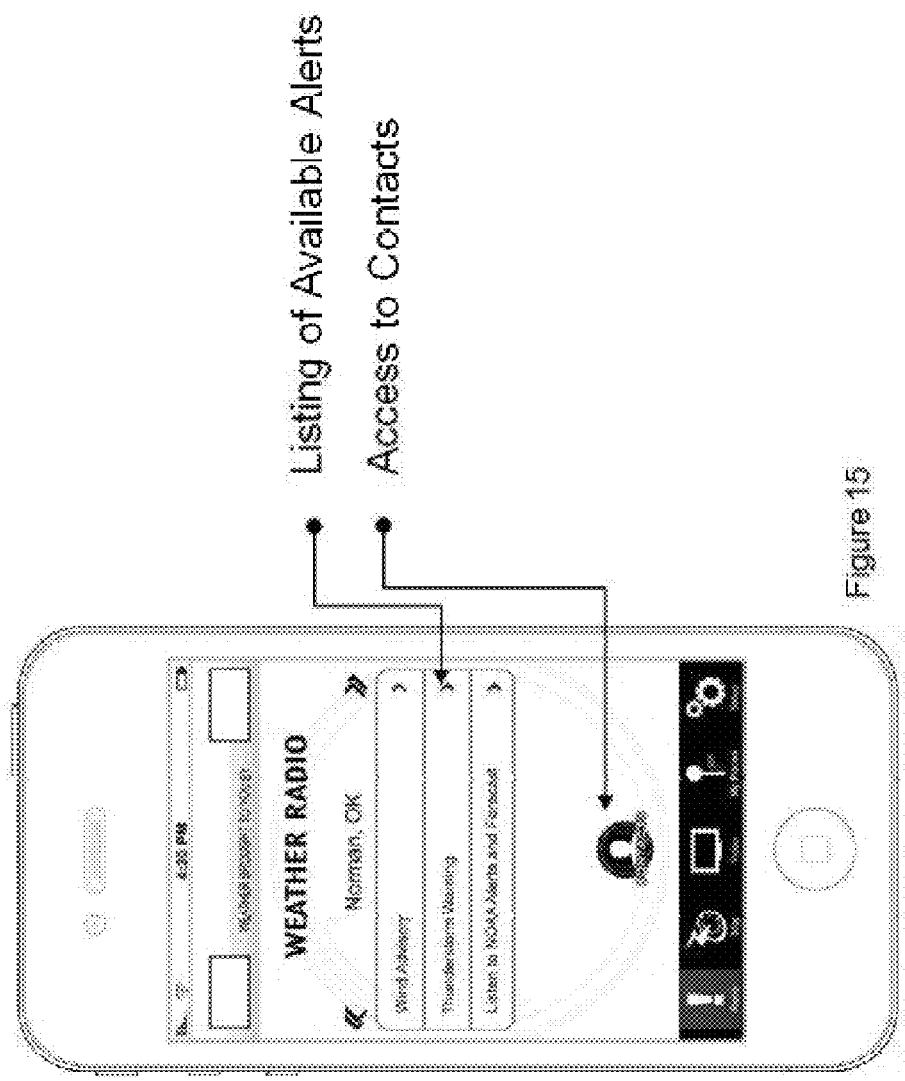

The weather alert list screen of FIG. 15 provides a listing of available weather alerts relevant to a current location in Norman, Okla. In this particular example, the available alerts of the listing are: a wind advisory, a thunderstorm warning, and an option to listen to NOAA alerts and forecasts. As illustrated, the alert box or panel may contain a button by which contact information may be accessed. It is noted that a contacts button may be placed in any screen shot of the alert application as desired.

Figure 16:
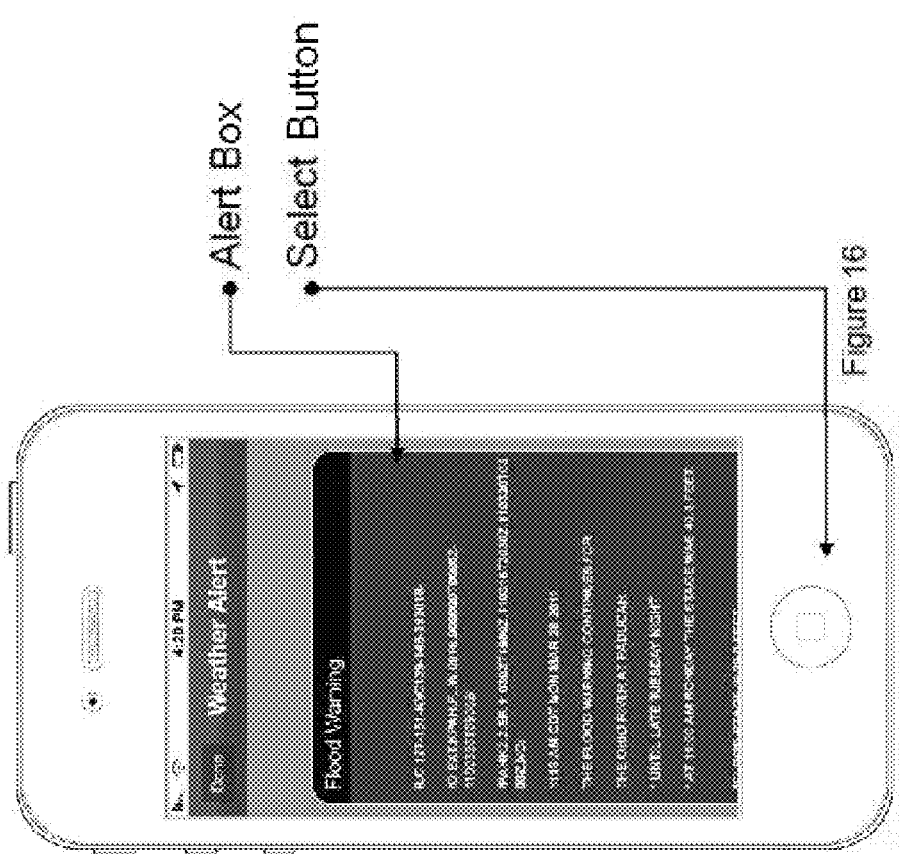

Once a user has selected to learn more about an alert listed in the alert listing of FIG. 14, a weather alert detail screen is displayed. Referring now to FIG. 16, the text detail of a flood warning is displayed in the alert box. Detailed alert information about the flood, such as time of alert, duration of alert, location of alert, severity, etc. are provided. The alert information is displayed as text in the alert panel and the user may scroll through this content as needed. The Select button may be selected to return to the alert list screen. It can be seen that the menu control buttons listed in the alert listing screen of FIG. 14 are not present, in order to maximize display area in the alert box. Also, the user may not wish to go to a different mode of the alert application from the alert detail screen so it is not necessary to provide the menu control buttons here.

Figure 17:
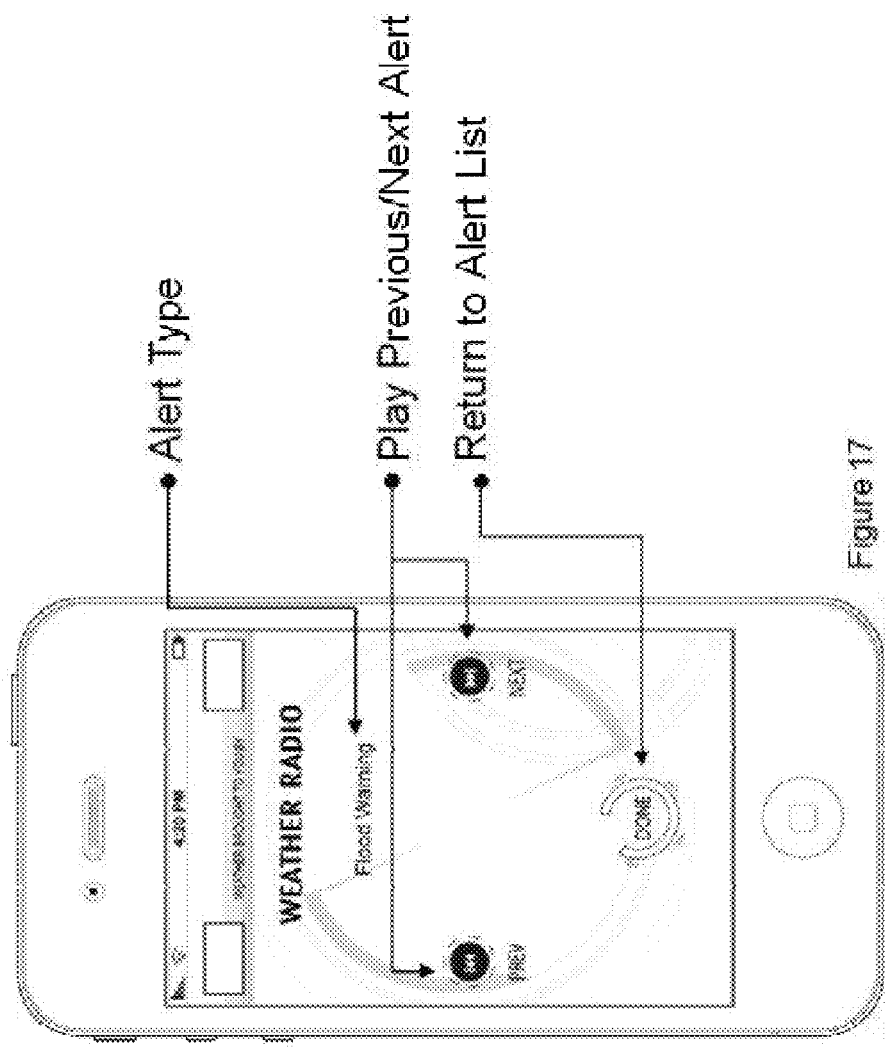

The screen shot of FIG. 17 provides an alternate way in which a user may navigate through alerts. A Flood warning is the alert type, and a user may navigate to play/view previous or next alerts by touching the backwards or forwards play button. Touching the Done button will return the user to the Alert List of a previous screen.

Figure 18:
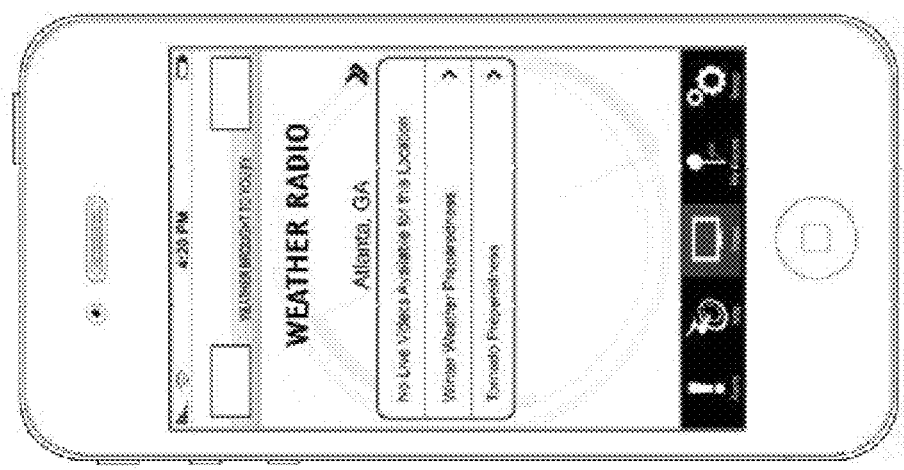

Next, as illustrated in the screen shot of FIG. 18, selection of the Video menu button of the Alert box displays for the user the available videos for a location, such as Atlanta, Ga., in this example. The available media options are listed as: no live videos available, a video on winter weather preparedness, and a video on tornado preparedness. Other types of audio/visual information may be listed and accessed if desired, such as photos, audio, streaming audio, etc.

Figure 19:
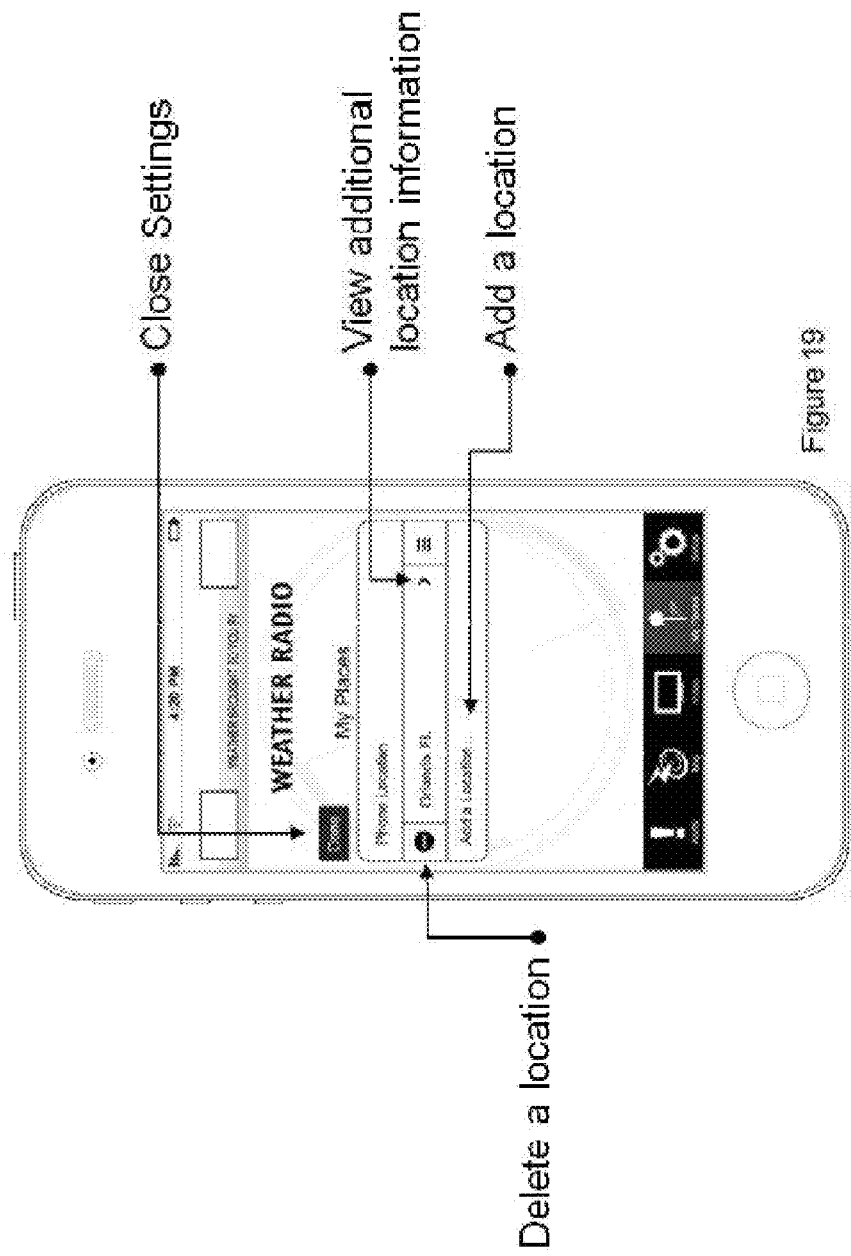
Figure 20:
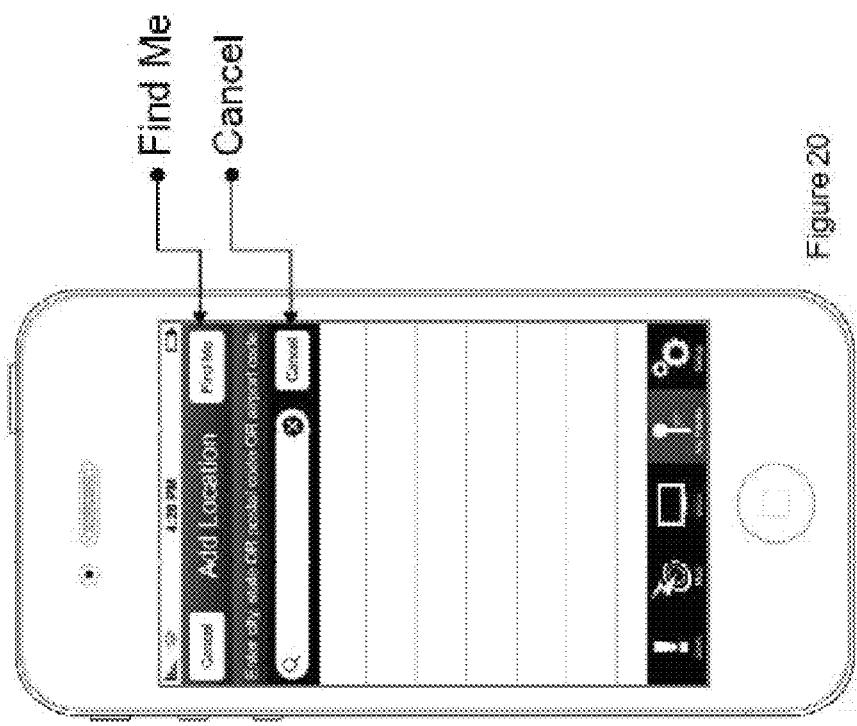
Figure 21:
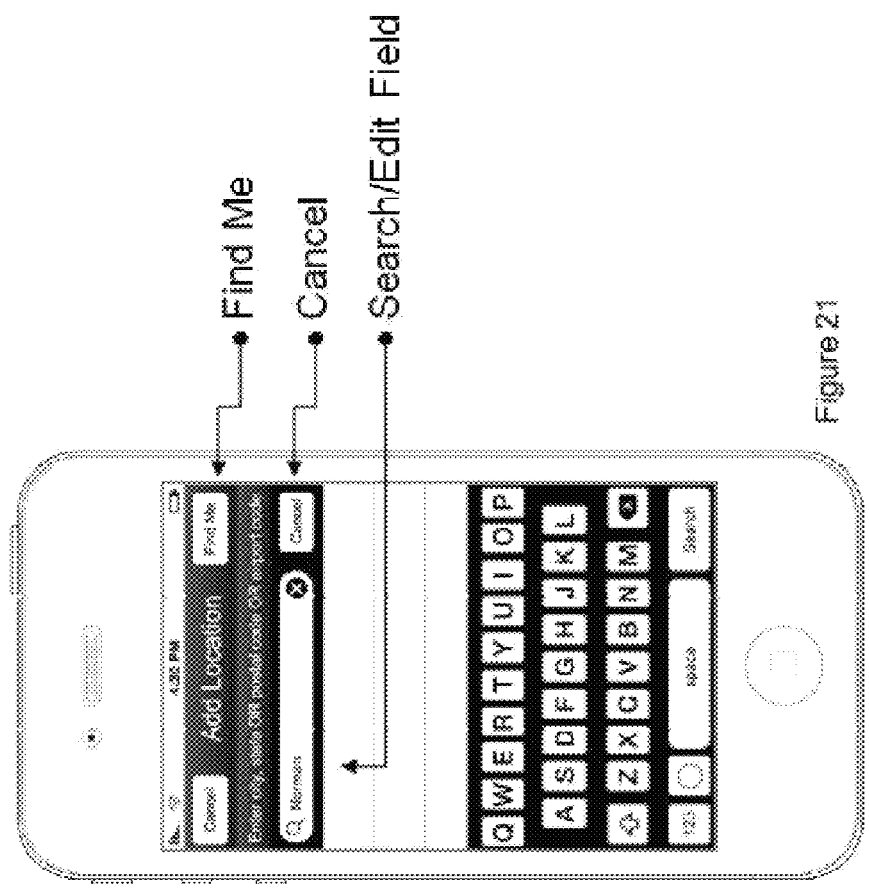

Referring now to FIG. 19, the My Places menu control button of the alert box accesses locations or places stored in the alert application of the phone and provides the opportunity to add new locations to be monitored or cancel/delete locations. In this particular example, a location of Orlando, Fla. is stored in the application. This allows a user to the alert application to receive alert information about Orlando as a stored and monitored location. This location may be deleted by activating the delete location button and additional information about the location or editing of the location may be accomplished by choosing to view additional location information about Orlando. Moreover, selection of the add a location button will bring up a screen that will allow a new location to be added to My Places. Touching the Done button will allow a user to close settings, returning to the previously viewed screen. As shown in FIG. 20, a new location may be added by entering a city and state, a postal (zip) code, an airport code, geographical location, or other point of interest (POI). FIG. 21 shows entry of a city in the search/edit field through use of the keyboard interface of the user interface in the alert box. The user types in the name of a city, postal code, airport code, geographical location, or other POI in the search edit field. In FIGS. 20 and 21, selection of the cancel button returns the user to the previously viewed screen. Also, selection of the Find Me button of the alert box enables the user to find their current location using the GPS capabilities of the mobile device.

Figure 22:
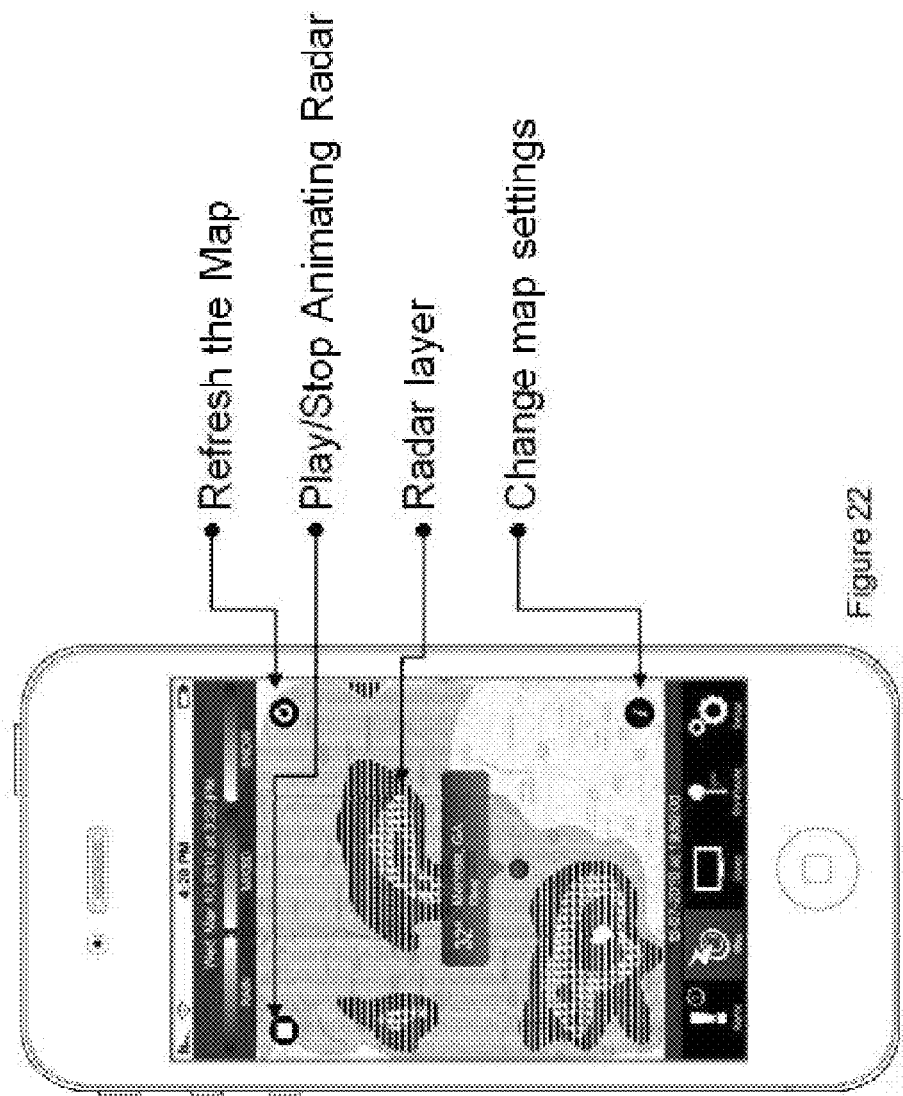
Figure 23:
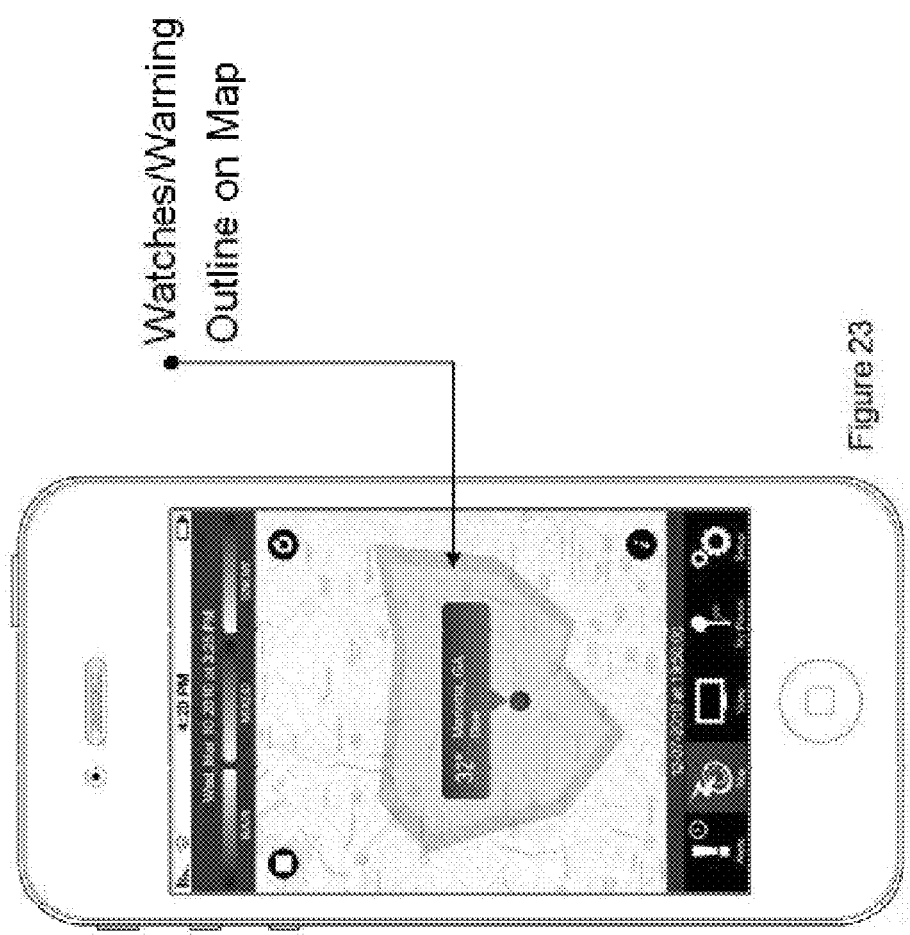

Referring now to the map panel screenshots of FIGS. 22 and 23, pressing the Map/Radar menu button of the alert box allows the user to view radar and map data about a selected alert. A user can navigate to this screen by touching the Map menu button of the alert box. As indicated in FIG. 22, there may be different regions of an alert, each corresponding to the level of severity of the warning. Thus, locations with a Watch may be shown with a yellow color or indicator, locations with a Warning may be shown with a red color or indicator, and locations with neither Watches nor Warnings may have blue color or indicator. As shown in FIG. 23, a geographical area subject to Watches/Warnings is outlined on the radar map.

A user may touch the play/stop button to play or stop animating radar in the alert box. The information "i" button may be touched to change map settings, such as to choose the layers to be shown on the radar map, etc. The refresh button may be touched to refresh the map. The user may touch the Alert button to return to the alert listing screen of the alert box.

Figure 24:
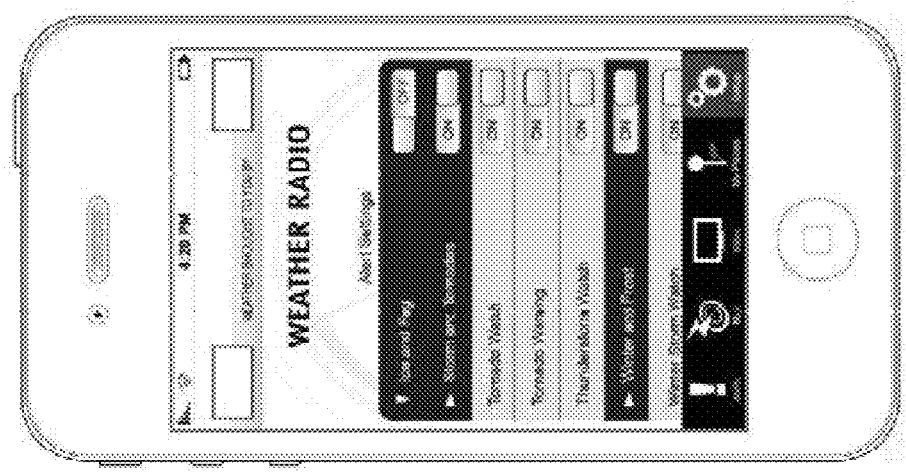

Referring now to FIG. 24, selection of the Setup menu button by the user allows the user to control certain setting of alerts, such as turning alerts on and off. There may be various alert settings of the alert application which the user may set by appropriate selection of alert settings. As shown in this example, a user may choose to turn ON or OFF the following alert settings: Ice and Fog, Storm and Tornados, Tornado Watch, Tornado Warning, Thunderstorm Watch, Winter and Frost, Winter Storm Watch. There may be any number of additional alert settings provided to the user by the alert application.

In accordance with various embodiments presented herein, a next generation mobile weather radio/emergency alerting system that will enable a mobile user to receive audio alerts, like the NOAA Weather Radio Network, visual alerts, geographic representation of the location of alerts, and video associated with alerts issued by organizations including the National Weather Service, FCC Emergency Alert System, and the Lightning Prediction Alert Service is provided.

In addition to allowing the user to receive alerts, the Mobile Weather Radio, using the Tile System, will increase the accuracy of alerts that notify the user from a 40 mile radius to a 1 mile radius. This will eliminate a whole series of issues around the NOAA Weather Radios where the user could be woken up or alerted for a condition or threat affecting a location up to 80 miles away.

The weather radio also can track a set of location-enabled devices for a user. The set of devices being tracked can include a device being carried by friends (when they allow it), the user's own device, or devices tracking assets. This tracking is done using the Tile structure insuring that the same accuracy is applied if the device is in motion or stationary.

Another primary benefit gained by issuing audio alerts using mobile devices is that the application is simple to setup, mobile once setup, and more likely to be near a person using the device when an alert is issued.

Therefore, at least the following characteristics or features of the various embodiments of Multimedia Alerting described herein are believed to be novel and therefore patentably distinct in accordance with the various embodiments:

1. The ability to match the location of a device to a media provider to supply Video and Audio based on the user's location.
2. The ability to allow users to be notified on a pending "high probability" of lightning activity within a specified range from the location of the device.
3. The ability to allow users to be notified of actual lightning events in a specified range of the location of the device.
4. The ability to match non-weather alerts, such as alerts issued by FEMA, Civil Defense, Homeland Security, or other Emergency Alerting System (EAS) notifications to the devices location to select the broadcast to render to the user of the device.
5. The ability to play locally broadcasted media about a severe weather situation localized to the user's device location.
6. The ability for the mobile device to receive NOAA Severe Weather Alerts for a general area and filter those alerts on the device based on the users location.
7. The ability to plot severe weather activity crossing the path of a moving vehicle based on location and speed coupled with the severe conditions location and speed.
8. The ability to register with the server to receive severe weather alerts from other mobile devices, such as, a device carried by children, spouse, or other family members. The registration process can thus include the requirement that the owner of the requested device warning allow the person or device to receive these notifications before allowing the registration to be completed.
9. This product will give the ability for the user to "dial for help" in the event that the event is of sufficient severity. In the event that a severe weather alert is issued based on the location of the targeted device using information about the devices location, an 'dial emergency number' button or 'dial 911' for the a location within the United States of America would be presented to the user. In the event that the received alert is not created for the receiving device, then the 'dial friend' button would replace the 'dial emergency' button.

10. Based on battery status, the application will alert the user to features that will consume significant amount of power thus allowing the user to prolong battery life in critical situations. These alerts would notify the user when they:
   a. Select to view video: an audio only broadcast option would be available.
   b. The device would automatically reduce the "Update Rate" of the devices location to report location at a slower rate thus reducing the number of times a radio transmission is necessary.

11. The ability for the user to elect to specify that alerts be automatically plotted on a map giving the user a better understanding where the severe weather activity is being observed in relation to the device location, other monitored devices, or other previously stored locations.

As was described above, alerts may be based upon weather data received from the NWS, for example, in which case NWS UGCs are converted to tile codes in a tiling process and used in the generation of desired alerts. Alerts may additionally be based upon weather prediction data, such as numerical weather prediction (NWP) data. Numerical weather prediction (NWP) data, which may be stored in a gridded form, is interpolated (converted) to a tile based grid (a tile based tile set) used by an alerting engine. These data are then compared by the alerting engine using tile comparisons to determine if a particular threshold is exceeded, not met or otherwise violated for a location (tile) of interest. If a threshold is exceeded an alert condition exists and an alert is generated.

Such prediction data, also referred to herein as weather prediction data, may come from a variety of sources, such as from the NWS, Navy, Air Force, or other providers who have their own prediction models, and as described herein may be converted to a tile based tile set that is useful for determining when one or more weather variable thresholds for one or more weather variables are violated at one or more geographical locations, thereby causing an alert to be triggered for the locations affected.

Weather prediction data is the result of the prediction of a one or more atmospheric or oceanic variables or conditions, such as temperature, wind speed, wave height, humidity, fog or mist. As used herein, the term weather variable therefore encompasses all of these examples as well as any other variables that are related to atmospheric, oceanic and weather conditions. A set of NWP data from a given model may consist of a number of grids (one each per variable, such as temperature, wind, humidity) for a number of time steps within a forecast or execution (in 1 hour increments out to 120 hours). Thus, at any given location within the NWP grid, a time series of each variable can be constructed for the length of the forecast (for example 120 points in a time series of temperature). Thus, weather prediction data contains information about one or more weather variables in a number of grids for a number of geographical locations with each weather variable at a given geographical location represented by a grid for a number of time periods within a weather forecast. As discussed above, locations of interest are stored as tile locations.

The tile based tile set has a number of prediction geographical tiles each associated with a location and one or more weather variables for the number of time periods within the weather forecast. Each of the geographical tiles is representative of a unique geographic projection of a rendered geographical area of defined size as has been described.

Figure 28:
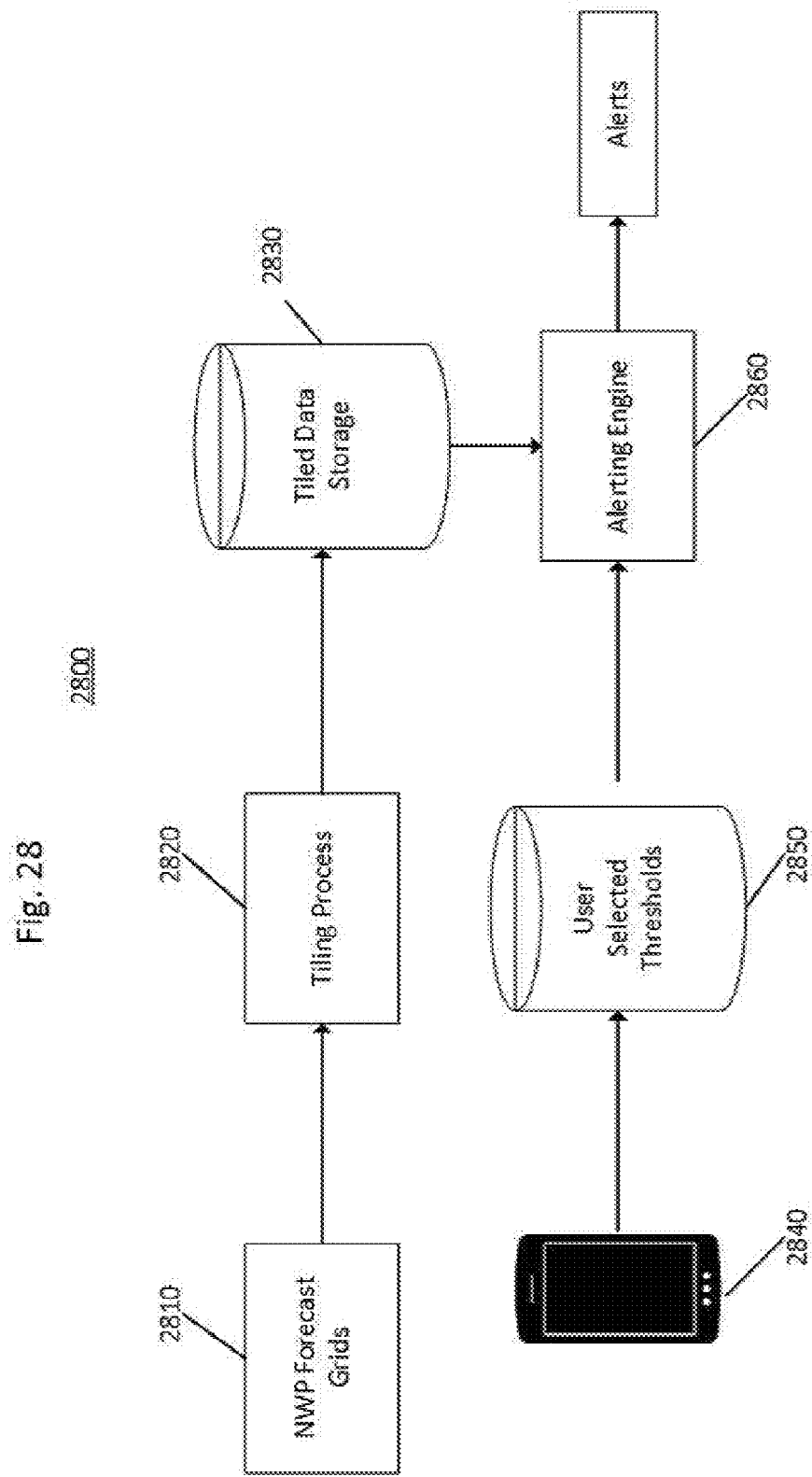
FIG. 28 is a flowchart of a high-level system flow for threshold alerting, in accordance with various representative embodiments.

Referring now to the high-level system flow for threshold alerting of FIG. 28, weather prediction data, shown as NWP forecast grids 2810, are received. The weather prediction data, which may be stored in a gridded form, is converted to a tile based tile set by a tiling process at Block 2820. The prediction geographical tile is stored in storage, such as at tiled data storage database 2830.

The weather variable threshold or thresholds used by the alerting engine 2860 when determining whether the received weather prediction data is representative of an alert condition is stored in user selected thresholds database 2850. The weather variable threshold(s) may be set or selected by a user via a user interface of a communication device such as a mobile communication device 2840 configured to run an alert application that allows the user to readily set and change the threshold(s) and relevant time periods of the threshold via a graphical user interface (GUI). The alerting engine 2860 determines for each time period of the forecast whether any of the weather variables associated with a prediction tile is in violation of a weather variable threshold for a location of the prediction tile. The alerting engine 2850 makes this determination by comparing for each time period of the forecast each weather variable associated with the prediction geographical tile to the weather variable threshold for the location associated with the prediction geographical tile.

Still further, each prediction geographical tile can be represented by a prediction tile code that contains the one or more weather variables for the number of time periods within the weather forecast. In this embodiment, comparing for each time period the prediction tile code to the weather variable threshold for the location associated with the prediction geographical tile may be done to determine for each time period of the forecast whether any of the one or more weather variables associated with each prediction geographical tile violates one or more weather variable thresholds.

If there are violations of one or more thresholds, an alert service provider can transmit to an alert processing server an alert notification of the alerts and generated alerts are stored in an alert database coupled to the alert processing server. Again, a Weather Alert Service Provider may receive weather alerts and notifications from The National Weather Service of the United States or other sources, such as a Lightning detection system, weather forecast system, disaster/emergency alert services or other sources. These alerts are delivered in encoded text from the Alert Service Provider or System. The encoded text includes information relating to the severity of the alert, the type of phenomena or event that the alert represents, text describing the alert, the watch/warning boxes of the alert, a beginning time (estimated time of arrival (ETA)), an ending time (estimated time of departure (ETD)), and the current area effected by the phenomena.

As discussed earlier, Alert Service Provider 105 sends the notification to Alert Processing Server 110 of the system 100 that an Alert is issued by a system, agency, or data provider. This notification is received by the system and stored in the Alert Database 115. The Alert Service Notification Server/Service 120 is notified by the Alert Database 115 that a message was stored. Thus, an alert notification server retrieves the alert notification from the alert database, such as alert database 115, and determines one or more alert geographical tiles of interest of the plurality of geographical tiles that are affected by the one or more alerts. Again, the alert geographical tiles are the defined size of the plurality of geographical tiles. For each alert:

a text portion of the alert is retrieved from the alert database and the text portion of the alert is processed to generate an audio version of the alert;

an alert text notification of the alert is constructed having the text portion of the alert, an alert identifier of the alert, a reference identifier for the audio version of the alert, the one or more alert geographical tiles and the one or more device identifiers for each of the one or more devices. The alert text notification is stored in an alert notification queue; and a gateway server 125 can retrieve one or more device identifiers for each device registered to receive alerts, the alert text notification and the alert identifier of the alert from the alert notification queue and transmit the alert text notification to the one or more devices corresponding to the retrieved one or more device identifiers.

Optionally, the gateway server may initially transmit only the alert text notification to devices corresponding to the retrieved device identifiers.

Figure 29:
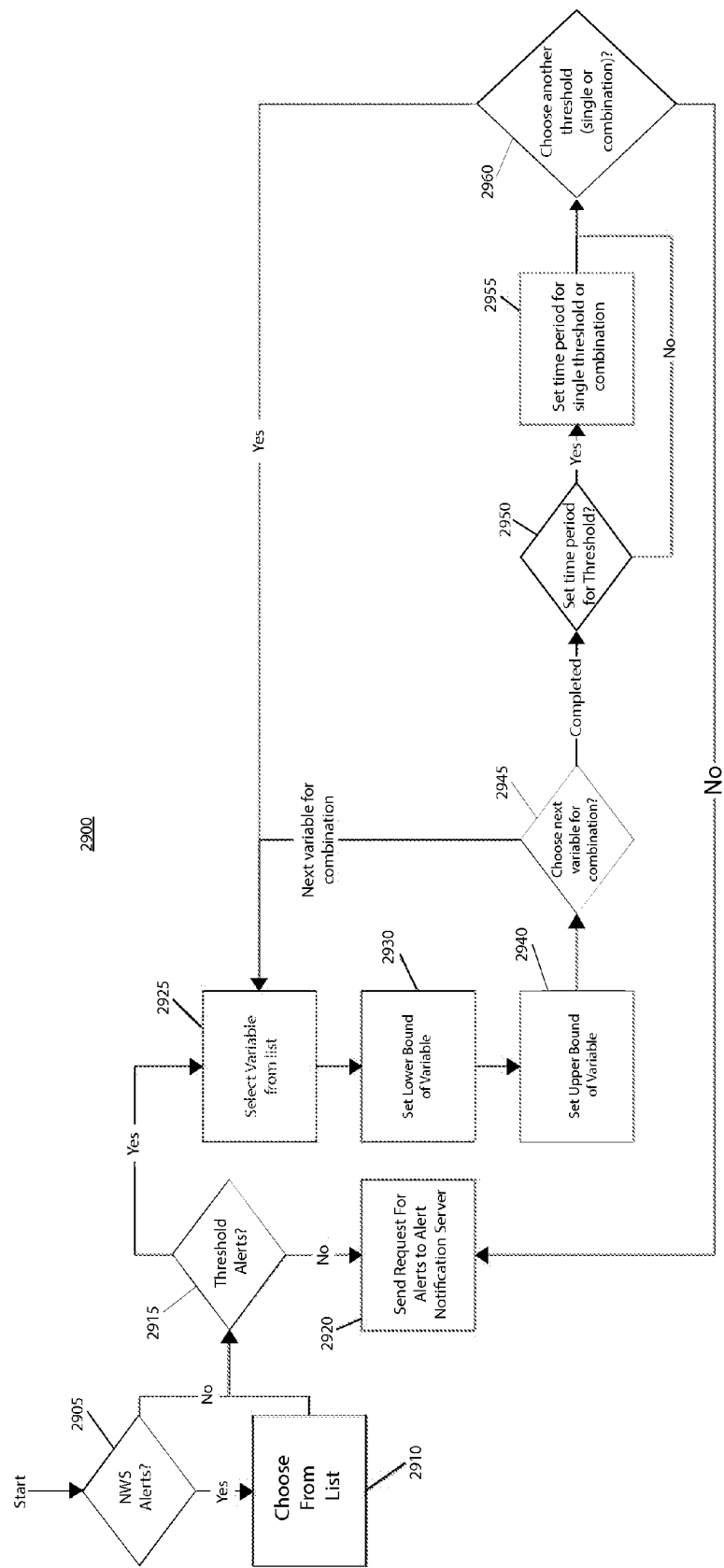
FIG. 29 is a flowchart of configuring alerts, in accordance with various representative embodiments.

Referring now to FIG. 29, flow 2900 illustrates the configuration of alerts, such as by a user. At Decision Block 2905, the inquiry is whether NWS alerts are to be configured. If then, then a user may choose at Block 2910 types of NWS alerts to be communicated about different weather conditions that are not weather predictions. These might include, for example, tornado warnings, severe thunderstorm warnings, flash flood advisories or warnings, or dense fog advisories. At Decision Block 2915, the inquiry is whether thresholds for threshold alerts are to be set. If no, then a request for alerts to be received in accordance with Blocks 2905 and 2910 is sent at Block 2920. If thresholds are to be set or changed, then the flow continues to Block 2925 where the type of weather variable, such as temperature, wind speed, wave height, humidity, fog or mist, is selected. The flow allows for one or many thresholds to be set or changed, including a discrete value of a weather variable for the location, a combination of values for two or more weather variables for the location, and a rate of change of a value of a weather variable for the location.

At Block 2930, a lower bound of a weather variable may be set while the upper bound is set at Block 2940. Depending upon how the threshold is to be used, only one bound need be set, as will be shown in the examples below. At Decision Block 2945, the query is whether a next weather variable is to be chosen and then set/changed. If yes, then the flow returns back to Block 2925. If another variable is not to be set or changed, then at Blocks 2950-2955, the time period may be set for a single threshold or multiple (combination) thresholds. Finally, at Decision Block 2960 there is the opportunity to set or change another weather variable threshold by returning to Block 2925 in the flow. If all the thresholds are set, however, a request for alerts to be generated in accordance with the set threshold(s) is sent at Block 2920. Thresholds or triggers for alert conditions are stored for each location in the received prediction data.

Figure 30:
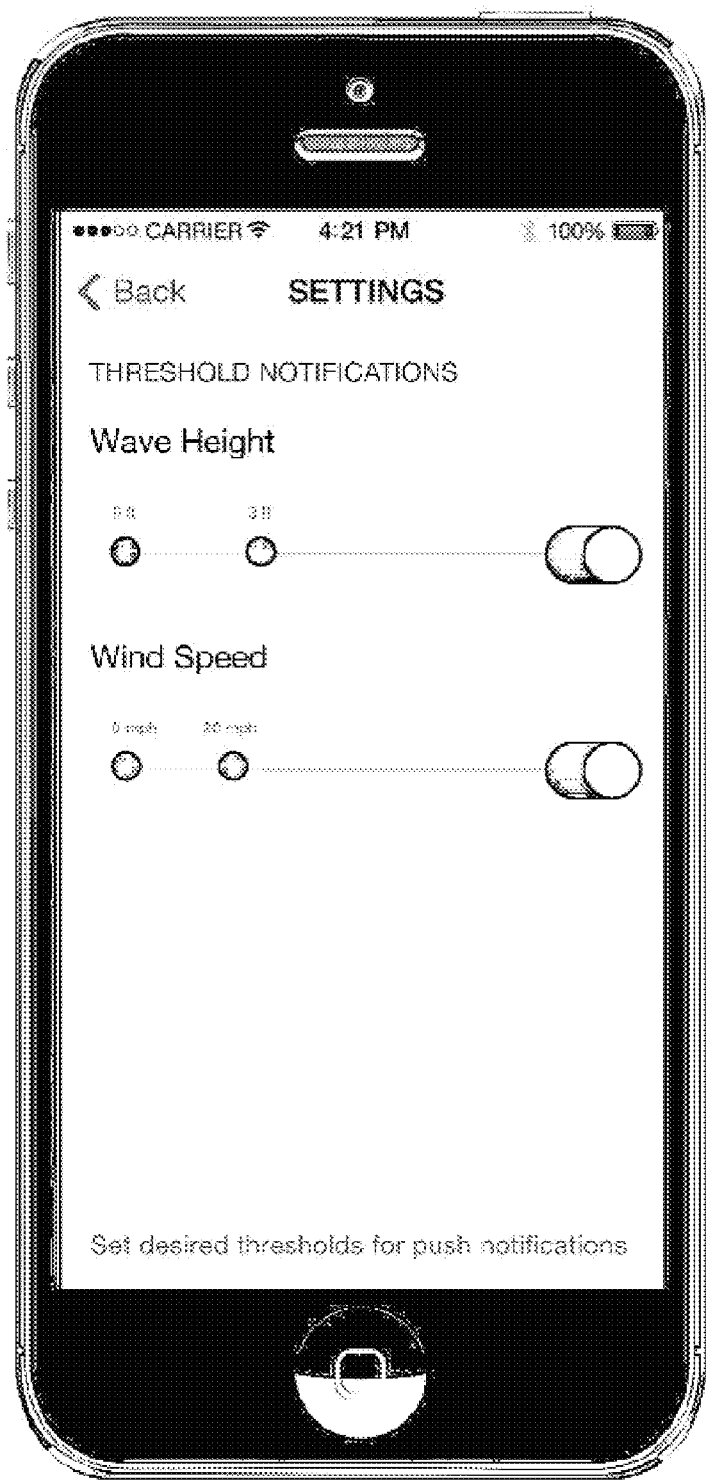
FIGS. 30-31 are screenshots of various user interfaces of an alerting application in which alerting thresholds may be set and changed, in accordance with various representative embodiments.
Figure 31:
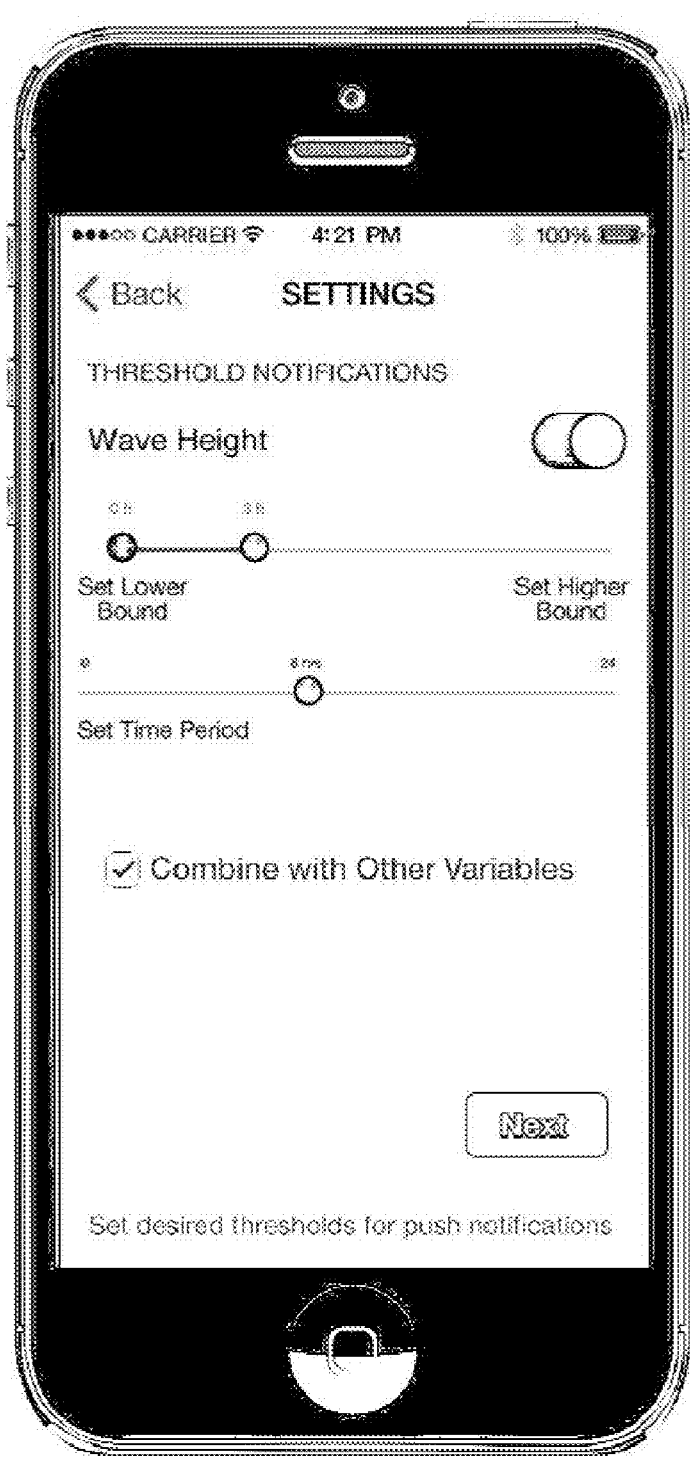

One or more weather variable thresholds for each time period of a weather forecast for a given location may be set as illustrated by Blocks 2925 to 2960 of FIG. 29, discussed above. A user may set the values and time durations of the weather variable thresholds by interacting with an alert application or other programmable means; as previously described, such an alert application may be an alert software program or software application, also referred to as an Alert Application, a Backend Application, or simply an "App", running on the device. In the graphical user interface reflected in the screen shot of FIG. 30, a user can set weather variable thresholds for both wind speed and wave height as shown, violation of which will cause an alert to be generated. The screenshot of FIG. 31 provides an illustration of a GUI that allows a user to set or change upper and lower bounds of wave height and the duration of a time period of the forecast. Other atmospheric and oceanic variables such as temperature, humidity, fog or mist may also be set and changed in similar manner.

In addition to the setting of discrete values for the location associated with a weather variable like wave height and wind speed in the example, the weather variable threshold may be a combination of values for two or more weather variable for a given location, or a rate of change of a value of a weather variable for the location. Moreover, whether a weather variable violates the weather variable threshold for the location may be at least partially determined by a length of time that the value of the weather variable exceeds or is less than the weather variable threshold. These various types of weather variable thresholds and how violation of which triggers threshold alerts to be generated and communicated are illustrated by the following examples.

As prediction data, such as NWP weather data, arrives at the alerting engine 2860, the data are put into the tile framework (the tile based tile set). The alerting engine then compares the NWP data for each time period in the forecast to the thresholds stored for the locations and if the thresholds are exceeded an alert condition is noted and an alert is formulated to send to a user.

Thresholds or triggers for alert conditions are stored for each location in the received prediction data. Some locations may have a sensitivity to extreme temperatures and thus thresholds or triggers of very high (upper bound) and very low (lower bound) temperatures are stored to be used in determine if an alert condition exists. Other locations may not have a sensitivity to temperature, but do have a sensitivity to high winds, and thus for those locations, thresholds of high winds are stored for that location. Setting thresholds of very high and very low temperatures is an example of setting a discrete value of a weather variable for that location.

Consider the example of a company that has a number of gas valves on natural gas heating systems that are known to fail when temperatures fall below 5 degrees Fahrenheit. When the company receives an alert of a forecast (predicted) temperature at 5 degrees Fahrenheit or below, it can put into action a plan to send employees to the facilities 12-24 hours before the temperature at those locations is forecast to go below 5 degrees Fahrenheit to put temporary heating solutions in place. In this example, a threshold of 5 degrees Fahrenheit is set as an upper bound since the concern is with temperatures less than 5 degrees Fahrenheit.

Consider also an outdoor concert planned for a spring weekend in which a crowd of 20,000 spectators is expected. The stages built for the concert are susceptible to winds above 35 mph. A strong cold front is forecast to pass through the area during the concert and winds are forecast to be 25-30 mph with gusts up to 40 mph. Upon receiving the alert triggered by the wind predictions above 35 mph for the concert venue, the concert planners and the stage builder make alternate plans for a lower profile stage with much higher wind tolerance as a precaution. In this example, a threshold having a lower bound of 35 mph is set since the concern is with wind speeds above 35 mph. The forecast of wind gusts up to 40 mph clearly violates this threshold and will cause an alert to be generated and communicated.

A variation of this is a combination of variables in a weather variable threshold analysis. For example, a particular location may not be susceptible to high winds unless the temperature is very cold. Thus, the combination of a temperature threshold (lower bound) and a wind threshold (upper bound) would act as a trigger for an alert. This is illustrated by the following example: A snow plowing company in the northern U.S. has employees who use large scale snow plowing equipment for parking lots and private roads for retail chain stores. As long as temperatures are above 20 degrees Fahrenheit and winds are below 20 mph, their plow operators are expected to also use push style blowers to clear sidewalks. When an alert with combined conditions forecast below 20 degrees Fahrenheit and higher than 20 mph is received by the dispatch facility, all operators are notified that they are to only operate the large scale plows and to wait for sidewalk clearing until the next business day. In this example, a combination threshold having bounds for both temperature and wind speed would be set.

The rate of change of a weather variable can be used in setting a threshold. For example, a particular location may not be susceptible to high or low temperatures, but may be susceptible to rapidly changing temperature over a short period of time. This is illustrated by the following. Consider a company that has a large number of large roof span buildings. When snow accumulates on the roofs, as long as temperatures stay below freezing, the snow on the roofs is of little concern to the integrity of the roofs. However, when temperatures rapidly change from below freezing to well above freezing the load from the melting snow can cause significant load on the roofs and increase the risk of a roof collapse. When a forecast of a rapid temperature warm up occurs and an alert is issued to the company, employees are tasked with shoveling and sweeping the snow from the roofs. In this example, the threshold would be set in light of rapid temperature change, namely a raid increase in temperature for a given time period.

The length of time that a threshold is exceeded may also be used to indicate an alert condition for which an alert is needed. For example, a particular location may not be susceptible to a low temperature for short periods of time, but may be susceptible to a low temperature below a threshold for a long period of time. For example, if temperatures fall below freezing for a very short amount of time, may hardy plants will survive. However, if temperatures remain below freezing for several hours, plants can be severely damaged, either dying or stunting further growth. With a forecast of temperatures below freezing for an extended period of time, a gardener can cover their plants or spray them with a small amount of water to the plants to protect them from the cold.

Consider a variation of the above in which a weather variable threshold is exceeded and followed closely by another weather variable threshold exceeded. For example, a particular location may not be susceptible to a specific amount of snow, but may be if a threshold amount of snow occurs followed by a rapid warmup in temperature that causes the snow to weigh more and create "snow load." As another example, a power utility company has large voltage power lines in some very rural areas of their service area. These power lines provide the method of power transmission to the main population centers where most of their customers reside. Vultures tend to roost on these power lines and where they roost, bird excrement builds up on the power lines. During times of fog or mist conditions, a build-up of excrement can serve as an electrical conductor and cause arching across the power lines that leads to power outages and potential fines for the power company. However, if moderate to heavy rain occurs in advance of the fog or mist conditions, the excrement is generally washed from the power lines. The power utility company can fly helicopter missions and power wash the excrement from the power lines. A forecast of fog or mist conditions following an extended period of no moderate or heavy rain can generate an alert to the power utility company that they should fly a helicopter mission to power wash the lines and mitigate the risk of a power outage.

Moreover, alerts for threshold violations may be sent to devices requesting to receive threshold alert data, which may include time of issue of the alert, a duration of the alert, a severity of the alert, a title of the alert, and a base text of the alert. In this case, a device may receive and process the alert text notification and request to receive alert data of the threshold alerts. Prior to the device requesting to receive alert data of the alert, a current location of the device represented by a device geographical tile may be obtained and converted to a device tile code representative of the current device location; the device tile code may be stored to a device location database as previously described. The device can receive and present received alert data to a user of the device through a user interface of the device. If the device is not authorized to receive alert notifications, the alert notification server can send to the device a request message, which may be sent responsive to user direction, requesting tracking of the device for alert notifications and if the request message is approved, the alert notification server updates the device location database to include the device as a registered device.

Still further, as described at length above alerts may be sent to location-enabled devices and that is applicable to alerts for threshold violations of weather variables. Location-enabled devices having a location that falls within an alert geographical tile are identified and a portion of the alert is retrieved from an alert database and processed to generate a media version of the alert. The alert text notification is constructed and has the text portion of the alert, the alert identifier of the alert, the reference identifier for the media version of the alert, the one or more alert geographical tiles, and one or more device identifiers. The device identifiers are retrieved for each affected devices, as well as the alert text notification and the alert identifier of the alert. The alert text notification is then transmitted to the devices corresponding to the retrieved one or more device identifiers.

Optionally, before a location-enabled device receives and processes the alert text notification and requests to receive alert data of the threshold violation alert, the current location of the device as reflected by a device geographical tile can be obtained, converted to a device tile code representative of the current device location and stored in a device location database. Whether the device is authorized to receive alert notifications can be determined as well. If the device is not authorized to receive alert notifications, a request message requesting tracking of the device for alert notifications is sent by the device. If the request message is approved, the device location database is updated to include the device as a registered device. A user of the device may make the request via a user interface of the device.

A method of providing alert information to a user using weather prediction data is provided. In particular, the method comprises: converting weather prediction data to a tile based tile set, the weather prediction data having information about one or more weather variables in a number of grids for a plurality of geographical locations with each weather variable at a given geographical location represented by a grid for a number of time periods within a weather forecast and the tile based tile set having a plurality of prediction geographical tiles with each prediction geographical tile associated with a location of the plurality of geographical locations and the one or more weather variables for the number of time periods within the weather forecast, each of the plurality of geographical tiles representative of a unique geographic projection of a rendered geographical area of defined size; determining for each time period of the forecast whether any of the one or more weather variables associated with each prediction geographical tile violates a weather variable threshold for the location associated with the prediction geographical tile, the determining performed by comparing for each time period of the forecast each weather variable of the one or more weather variables associated with the prediction geographical tile to the weather variable threshold for the location associated with the prediction geographical tile; and generating and communicating one or more alerts corresponding to one or more violations of the weather variable thresholds for the locations associated with the prediction geographical tiles.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of providing alert information to a user using weather prediction data, comprising:

converting weather prediction data to a tile based tile set, the weather prediction data having information about one or more weather variables in a number of grids for a plurality of geographical locations with each weather variable at a given geographical location represented by a grid for a number of time periods within a weather forecast and the tile based tile set having a plurality of prediction geographical tiles with each prediction geographical tile associated with a location of the plurality of geographical locations and the one or more weather variables for the number of time periods within the weather forecast, each of the plurality of geographical tiles representative of a unique geographic projection of a rendered geographical area of defined size;

determining for each time period of the forecast whether any of the one or more weather variables associated with each prediction geographical tile violates a weather variable threshold for the location associated with the prediction geographical tile, the determining performed by comparing for each time period of the forecast each weather variable of the one or more weather variables associated with the prediction geographical tile to the weather variable threshold for the location associated with the prediction geographical tile;

generating and communicating by a server over a communications network one or more alerts corresponding to one or more violations of the weather variable thresholds for the locations associated with the prediction geographical tiles;

determining whether a device is authorized to receive alert notifications;

if the device is not authorized to receive alert notifications, the alert notification server sending to the device a request message requesting tracking of the device for alert notifications; and if the request message is approved, the alert notification server updating the device location database to include the device as a registered device.

2. The method of claim 1, wherein each prediction geographical tile is represented by a prediction tile code that contains the one or more weather variables for the number of time periods within the weather forecast and determining for each time period of the forecast whether any of the one or more weather variables associated with each prediction geographical tile violates a weather variable threshold comprises comparing for each time period the prediction tile code to the weather variable threshold for the location associated with the prediction geographical tile.

3. The method of claim 1, further comprising a threshold alerting engine performing determining for each time period of the forecast whether any of the one or more weather variables associated with each prediction geographical tile violates a weather variable threshold for the location associated with the prediction geographical tile.

4. The method of claim 1, wherein generating and communicating the one or more alerts comprises:
an alert service provider transmitting to an alert processing server an alert notification of the one or more alerts;
storing the one or more generated alerts in an alert database coupled to the alert processing server;
an alert notification server retrieving the alert notification from the alert database and determining one or more alert geographical tiles of interest of the plurality of geographical tiles that are affected by the one or more alerts, wherein the one or more alert geographical tiles are the defined size of the plurality of geographical tiles;
for each alert of the one or more alerts:
retrieving a text portion of the alert from the alert database and processing the text portion of the alert to generate an audio version of the alert;
constructing an alert text notification of the alert having the text portion of the alert, an alert identifier of the alert, a reference identifier for the audio version of the alert, the one or more alert geographical tiles and the one or more device identifiers for each of the one or more devices and storing the alert text notification into an alert notification queue; and
a gateway server retrieving one or more device identifiers for each of one or more devices registered to receive alerts, the alert text notification and the alert identifier of the alert from the alert notification queue and transmitting the alert text notification to the one or more devices corresponding to the retrieved one or more device identifiers.

5. The method of claim 4, the gateway server initially transmitting only the alert text notification to the one or more devices corresponding to the retrieved one or more device identifiers.

6. The method of claim 4, further comprising:
the device of the one or more devices receiving and processing the alert text notification and requesting to receive alert data of the alert, wherein prior to the device of the one or more devices requesting to receive alert data of the alert further comprising:
the device receiving and presenting to a user of the device the received alert data of the alert through a user interface of the device.

7. The method of claim 6, the device requesting to receive alert data of the alert responsive to user direction.

8. The method of claim 6, wherein prior to the device of the one or more devices requesting to receive alert data of the alert also further comprising:
obtaining a current location of the device represented by a device geographical tile; and
converting the current location of the device to a device tile code and storing the device tile code representative of the current device location to a device location database.

9. The method of claim 6, further comprising the device requesting to receive alert data of the alert from a web-based service and downloading the alert data from the web-based service.

10. The method of claim 6, wherein in response to a request from the user of the device using the user interface of the device, further comprising requesting to receive media data related to the alert associated with the device tile code of the device geographical tile of the device from a third-party media provider.

11. The method of claim 10, wherein in response to the request from the user, a software application registered to receive alerts for the device requesting to receive media data from the third-party media provider.

12. The method of claim 11, further comprising the software application downloading metadata associated with the third-party media provider from a media server and rendering the metadata to the user for selection via the user interface of the device.

13. The method of claim 10, further comprising:
the device downloading a list of available media associated with the device tile code of the device geographical tile of the device for the alert from a media server; and
upon selection by the user using the user interface of one or more media from the list of available media, downloading the one or more media to the device from the media server.

14. The method of claim 6, wherein in response to receiving notification of the occurrence of an alert, the device notifying a software application registered to receive alerts for the device.

15. The method of claim 14, further comprising the software application processing the alert text notification and requesting to receive alert data of the alert from a web-based service, the device receiving alert data of the alert, and the software application controlling a user interface of the device to present to a user of the device the received alert data through the user interface of the device.

16. The method of claim 15, further comprising the software application requesting to receive alert data of the alert from the web-based service and downloading the alert data from the web-based service.

17. The method of claim 15, further comprising the device receiving the audio version of the alert and the application software controlling the device to play the audio version of the alert via the user interface of the device.

18. The method of claim 6, further comprising the device receiving and presenting to a user of the device the received alert data of the one or more alerts through a user interface of the device.

19. The method of claim 18, further comprising the device requesting and receiving the audio version of the one or more alerts and playing the audio version of the one or more alerts via the user interface of the device.

20. The method of claim 19, further comprising the device retrieving a media file associated with an alert of the one or more alerts from a text-to-speech cache server and rendering the audio of the media file to the user of the device using a text-to-speech engine coupled to the text-to-speech cache server.

21. The method of claim 18, wherein the received alert data presented to the user through a user interface of the device comprises one or more of alert text of an alert, alert audio of the alert, and a geographical map representation of the alert.

22. The method of claim 18, further comprising the device storing received alert data of the one or more alerts in a device database.

23. The method of claim 1, further comprising in response to receipt of a request message requesting tracking of the device for alert notifications, the device:
prompting a user of the device to accept or reject receive alerts on the device; and
if the user accepts to receive alerts on the device, the device sending a grant request message to an alert service provider authorizing tracking of the device for alert notifications.

24. The method of claim 4, wherein the alert data further comprises one or more of a time of issue of the alert, a duration of the alert, a severity of the alert, a title of the alert, and a base text of the alert.

25. The method of claim 4, further comprising:
determining one or more location-enabled devices each having a location that falls within an alert geographical tile of the one or more alert geographical tiles;
retrieving a portion of the alert from an alert database and processing the portion of the alert to generate a media version of the alert;
constructing an alert text notification of the alert having the text portion of the alert, the alert identifier of the alert, the reference identifier for the media version of the alert, the one or more alert geographical tiles, and one or more device identifiers for each of the one or more devices; and
retrieving the one or more device identifiers for each of the one or more devices, the alert text notification and the alert identifier of the alert and transmitting the alert text notification to the one or more devices corresponding to the retrieved one or more device identifiers.

26. The method of claim 25, wherein prior to a device of the one or more devices receiving and processing the alert text notification and requesting to receive alert data of the alert further comprising:

obtaining a current location of the device represented by a device geographical tile; and
converting the current location of the device to a device tile code and storing the device tile code representative of the current device location to a device location database;
receiving and presenting to a user of the device the received alert data of the alert through a user interface of the device;
determining whether the device is authorized to receive alert notifications;
if the device is not authorized to receive alert notifications, sending to the device a request message requesting tracking of the device for alert notifications; and
if the request message is approved, updating the device location database to include the device as a registered device.

27. The method of claim 26, further comprising the device requesting to receive alert data of the alert responsive to user direction.

28. The method of claim 1, wherein the weather variable threshold for the location associated with the prediction geographical tile is a rate of change of a value of a weather variable for the location.

29. The method of claim 1, wherein whether a weather variable violates the weather variable threshold for the location is at least partially determined by a length of time that the value of the weather variable exceeds or is less than the weather variable threshold, wherein the length of time is greater than the time required to detect the weather variable.

30. The method of claim 1, wherein the one or more weather variables comprise one or more of the atmospheric and oceanic variables of temperature, wind speed, wave height, humidity, fog or mist.

31. The method of claim 1, further comprising: setting the weather variable threshold for one or more of the one or more weather variables for each time period of the weather forecast.

32. The method of claim 31, wherein setting the weather variable threshold comprises setting one or more of an upper bound, a lower bound, and combining a first weather variable threshold with a second weather variable threshold.

* * * * *